United States Patent
Silvestri

(10) Patent No.: US 9,871,842 B2
(45) Date of Patent: *Jan. 16, 2018

(54) METHODS AND SYSTEMS FOR NETWORK BASED VIDEO CLIP PROCESSING AND MANAGEMENT

(71) Applicant: EVERTZ MICROSYSTEMS LTD., Burlington (CA)

(72) Inventor: Vince Silvestri, Burlington (CA)

(73) Assignee: Evertz Microsystems Ltd., Burlington (CA)

( * ) Notice: Subject to any disclaimer, the term of this patent is extended or adjusted under 35 U.S.C. 154(b) by 386 days.

This patent is subject to a terminal disclaimer.

(21) Appl. No.: 13/837,579

(22) Filed: Mar. 15, 2013

(65) Prior Publication Data
US 2014/0164636 A1    Jun. 12, 2014

Related U.S. Application Data

(60) Provisional application No. 61/735,003, filed on Dec. 8, 2012.

(51) Int. Cl.
| | |
|---|---|
| *H04L 29/06* | (2006.01) |
| *H04N 21/234* | (2011.01) |
| *H04N 21/85* | (2011.01) |
| *G11B 27/34* | (2006.01) |
| *H04L 29/08* | (2006.01) |
| *H04N 21/43* | (2011.01) |

(52) U.S. Cl.
CPC ............. *H04L 65/60* (2013.01); *G11B 27/34* (2013.01); *H04L 65/4076* (2013.01); *H04L 65/604* (2013.01); *H04L 67/325* (2013.01); *H04N 21/23424* (2013.01); *H04N 21/4307* (2013.01); *H04N 21/85* (2013.01); *H04L 65/4069* (2013.01); *H04L 65/607* (2013.01)

(58) Field of Classification Search
CPC ............. H04N 7/17318; H04N 21/858; H04N 21/231; H04N 21/232; H04N 21/234; H04N 21/23424; H04N 21/85; H04L 65/4069; H04L 65/60; H04L 65/1066; H04L 65/601; H04L 65/4076; H04L 65/4084; H04L 65/604; G11B 27/34
See application file for complete search history.

(56) References Cited

U.S. PATENT DOCUMENTS

| | | | |
|---|---|---|---|
| 5,557,423 A | | 9/1996 | Phillips et al. |
| 5,666,554 A | * | 9/1997 | Tanaka ...................... G06T 1/00 707/999.003 |

(Continued)

OTHER PUBLICATIONS

Document relating to U.S. Appl. No. 14/444630, dated Sep. 11, 2017 (Office Action).

*Primary Examiner* — Ramy M Osman
(74) *Attorney, Agent, or Firm* — Bereskin & Parr LLP/S.E.N.C.R.L., s.r.l.

(57) ABSTRACT

Methods and system for managing media clips over a data network. Media streams may be received over a data network and stored by a storage server. Metadata regarding the media streams may be generated and stored at a metadata server. A control station can retrieve media frames originating in the stored media streams from the storage server, based on metadata. Media frames from multiple media streams can be retrieved and displayed in synchronization, based on respective timecodes.

22 Claims, 13 Drawing Sheets

(56) References Cited

U.S. PATENT DOCUMENTS

| | | |
|---|---|---|
| 5,995,976 A | 11/1999 | Walker et al. |
| 6,351,765 B1* | 2/2002 | Pietropaolo ............ G11B 27/34 348/722 |
| 6,760,721 B1 | 7/2004 | Chasen et al. |
| 6,859,799 B1* | 2/2005 | Yuen ................. G06F 17/30265 |
| 7,197,566 B1 | 3/2007 | Kuzma |
| 7,434,155 B2 | 10/2008 | Lee |
| 7,797,719 B2 | 9/2010 | Drakoulis et al. |
| 7,843,592 B2 | 11/2010 | Bodin et al. |
| 8,301,724 B2* | 10/2012 | Alexander ............ G06Q 30/02 705/14.4 |
| 8,656,445 B2* | 2/2014 | Ress et al. .................... 725/120 |
| 9,032,297 B2* | 5/2015 | Lovejoy ............... G11B 27/034 715/723 |
| 2001/0014891 A1 | 8/2001 | Hoffert et al. |
| 2002/0023103 A1 | 2/2002 | Gagne |
| 2002/0099789 A1* | 7/2002 | Rudolph ........... G06F 17/30017 709/217 |
| 2003/0001880 A1 | 1/2003 | Holtz et al. |
| 2003/0088877 A1 | 5/2003 | Loveman et al. |
| 2003/0090504 A1* | 5/2003 | Brook ................... G11B 27/34 715/716 |
| 2003/0154217 A1* | 8/2003 | Kinno ............... G06F 17/30817 |
| 2004/0150663 A1* | 8/2004 | Kim ..................... G11B 27/034 715/723 |
| 2004/0216173 A1 | 10/2004 | Horoszowski et al. |
| 2005/0071736 A1 | 3/2005 | Schneider et al. |
| 2005/0111839 A1 | 5/2005 | Sullivan |
| 2006/0053470 A1 | 3/2006 | Colter et al. |
| 2006/0184980 A1 | 8/2006 | Cole |
| 2007/0067427 A1 | 3/2007 | Bugir et al. |
| 2007/0162571 A1* | 7/2007 | Gupta ................ H04N 21/4325 709/219 |
| 2007/0186006 A1* | 8/2007 | Murray ........................ 709/231 |
| 2007/0198570 A1 | 8/2007 | Prahlad et al. |
| 2007/0239896 A1 | 10/2007 | Sohn et al. |
| 2008/0013916 A1* | 1/2008 | Sharpe ................ G11B 27/034 386/278 |
| 2008/0141307 A1 | 6/2008 | Whitehead |
| 2008/0168499 A1 | 7/2008 | Kuroiwa et al. |
| 2008/0222201 A1 | 9/2008 | Chen et al. |
| 2009/0119322 A1* | 5/2009 | Mills ................. G06F 17/30017 |
| 2009/0216742 A1* | 8/2009 | Coffman et al. .................. 707/5 |
| 2010/0050080 A1 | 2/2010 | Libert et al. |
| 2010/0077438 A1 | 3/2010 | Ansari |
| 2010/0083077 A1* | 4/2010 | Paulsen ................. G11B 27/34 715/202 |
| 2010/0094931 A1 | 4/2010 | Hosur et al. |
| 2010/0153520 A1* | 6/2010 | Daun ................... H04N 21/854 709/218 |
| 2010/0153577 A1* | 6/2010 | Wohlert et al. ............... 709/231 |
| 2010/0180297 A1* | 7/2010 | Levine ............... H04N 21/4307 725/38 |
| 2010/0281042 A1 | 11/2010 | Windes et al. |
| 2010/0281386 A1 | 11/2010 | Lyons et al. |
| 2011/0004613 A1* | 1/2011 | Arrasvuori ........ G06F 17/30056 707/769 |
| 2011/0055881 A1* | 3/2011 | Yu ...................... H04N 7/17336 725/88 |
| 2011/0078743 A1 | 3/2011 | Kim et al. |
| 2011/0083073 A1* | 4/2011 | Atkins et al. ................. 715/704 |
| 2011/0219308 A1* | 9/2011 | Ramamurthy ....... G11B 27/034 715/719 |
| 2012/0136919 A1* | 5/2012 | Huang ................. G11B 27/034 709/203 |
| 2012/0163770 A1* | 6/2012 | Kaiser .................... H04N 21/84 386/241 |
| 2012/0206653 A1 | 8/2012 | Graves et al. |
| 2012/0254711 A1* | 10/2012 | Sumler et al. ................ 715/202 |
| 2012/0271849 A1* | 10/2012 | Lesser ............... G06F 17/30106 707/770 |
| 2012/0291078 A1* | 11/2012 | Weerasinghe ... H04N 21/23424 725/109 |
| 2012/0311651 A1* | 12/2012 | Kahn ............... H04N 21/23805 725/116 |
| 2012/0317302 A1* | 12/2012 | Silvestri et al. .............. 709/231 |
| 2013/0044805 A1* | 2/2013 | Vestergaard ............ G06F 3/14 375/240.02 |
| 2013/0125000 A1 | 5/2013 | Fleischhauer et al. |
| 2013/0195421 A1* | 8/2013 | Chen ................... G11B 27/034 386/239 |
| 2014/0025836 A1* | 1/2014 | Gupta ................ H04L 65/4084 709/231 |
| 2014/0090002 A1* | 3/2014 | Silvestri ............... H04L 65/604 725/115 |
| 2014/0114904 A1* | 4/2014 | Choo .................... G06Q 50/22 706/50 |
| 2014/0164636 A1* | 6/2014 | Silvestri ................. H04L 65/60 709/231 |
| 2014/0301386 A1* | 10/2014 | Harrenstien ...... G06F 17/30849 370/352 |

\* cited by examiner

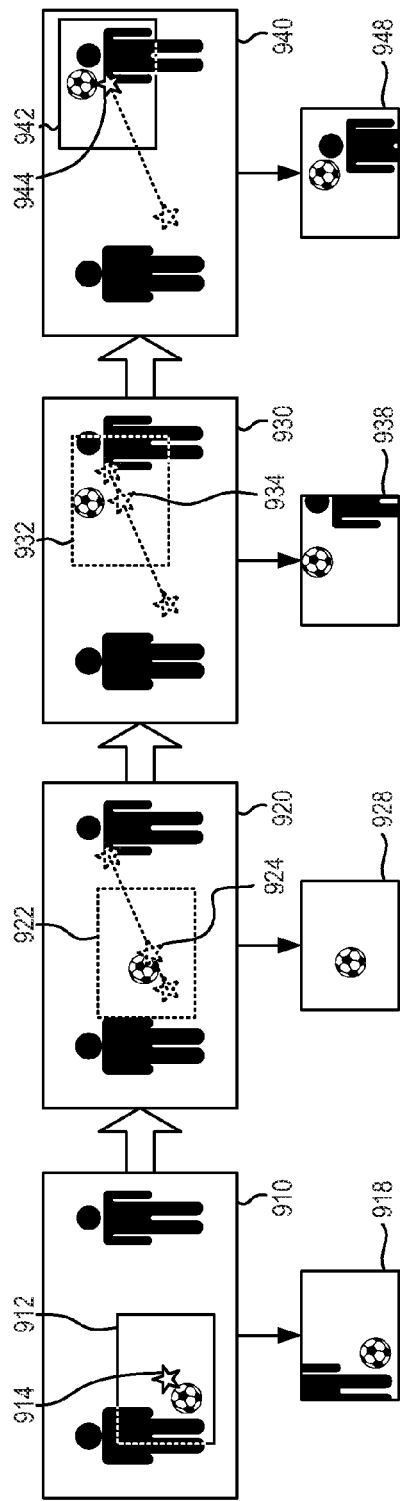
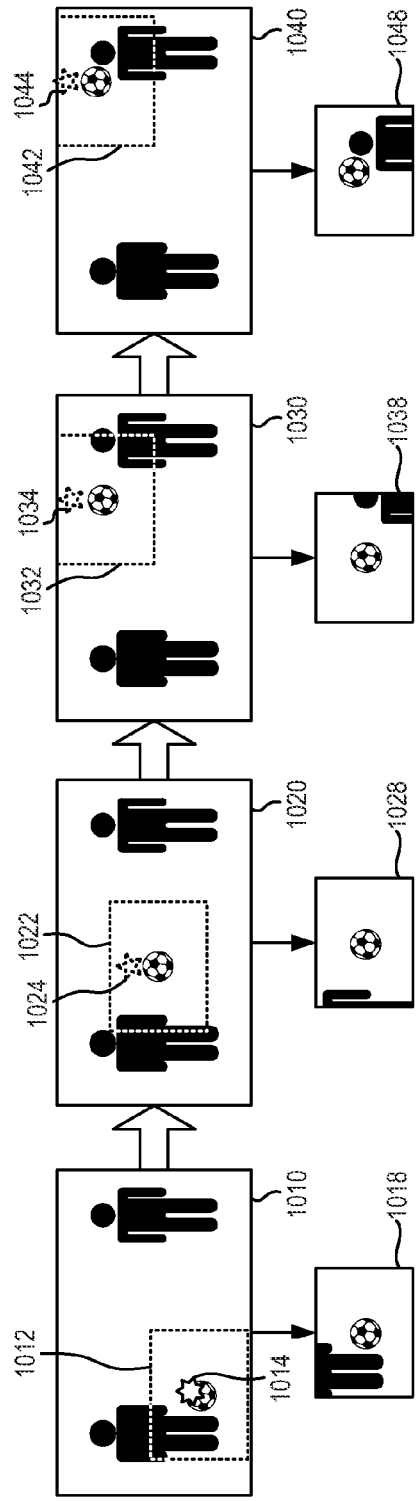

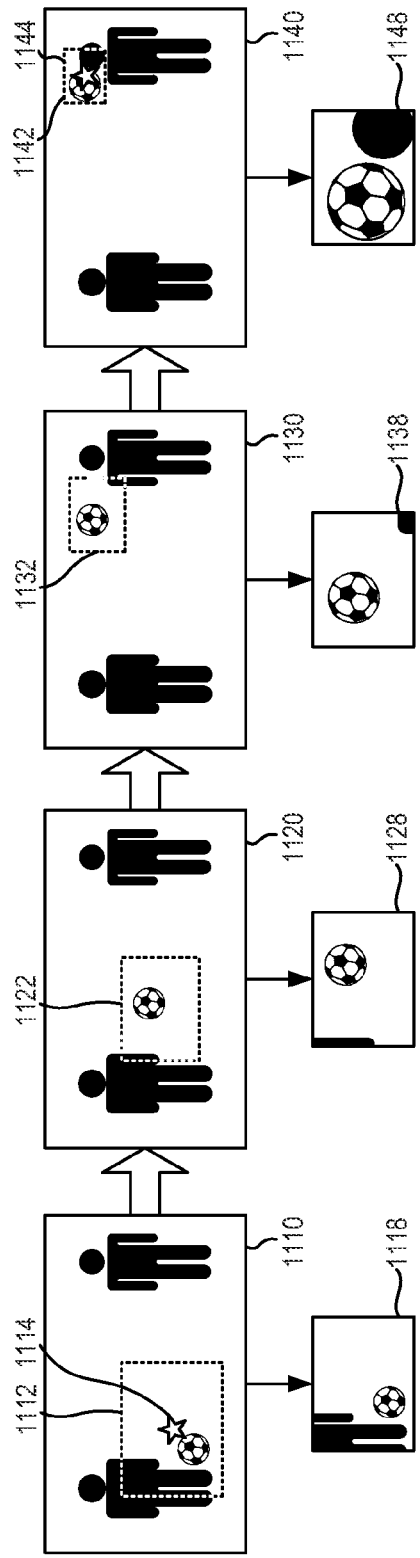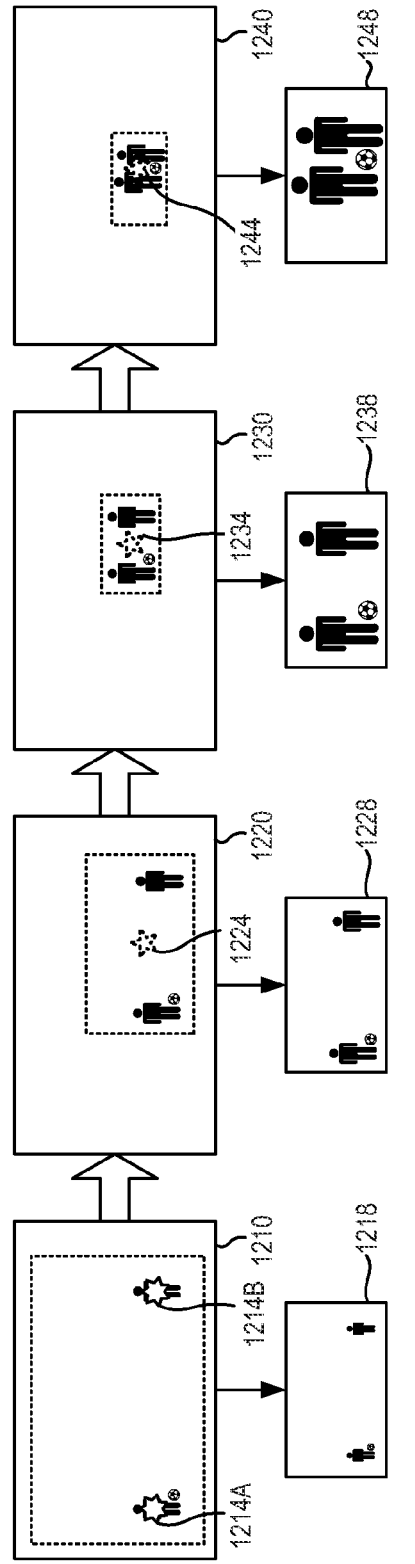

METHODS AND SYSTEMS FOR NETWORK BASED VIDEO CLIP PROCESSING AND MANAGEMENT

FIELD

The described embodiments relate to systems and methods for generating and editing media clips from media data and, in particular, to generating and editing instant replay media clips.

BACKGROUND

In many areas of television broadcasting, and sports broadcasting in particular, recorded video footage is often excerpted and displayed several times using a technique commonly known as video replay. One particular form of video replay is known as instant replay, in which a video excerpt or "clip" is replayed very soon after it has occurred. Video replays may be replayed at normal speed, at reduced speed ("slow motion"), at increased speed, or paused ("freeze frame"). In addition, video replays sometimes may be played in reverse. In combination, the application of all of these playback techniques is sometimes referred to as "scrubbing".

Conventional replay systems typically rely on a plurality of skilled operators, who may continuously monitor a small number of video feeds (e.g., one or two each) and manually generate replay clips that may be of interest. Subsequently, at the instruction of a program director, the operator may manually control playback of the clip, which can be fed to a broadcast output in a studio.

Such an approach is labor intensive. Moreover, it may limit the ability of program directors to provide camera angles of interest in a timely manner for broadcast. For example, different operators may be responsible for different camera feeds, and it may be difficult to coordinate between the operators in such a manner so as to provide synchronized playback of separate clips, even though the clips themselves may display the same event from different angles.

SUMMARY

In a first broad aspect, there is provided a method of managing media clips over a data network, the method comprising: receiving a plurality of media streams from a plurality of media sources; and for each of the plurality of media streams, wherein each of the plurality of media streams comprises a plurality of media frames: determining a timecode for each of the plurality of media streams, the timecode comprising a plurality of timecode references to the plurality of media frames; and storing the plurality of media streams at a storage server, wherein the plurality of media frames are retrievable over the data network based on at least one selected timecode reference.

In some cases, the plurality of media streams are received via the data network.

The method may further comprise generating a metadata record associated with the plurality of timecode references in a metadata database.

In some cases, the metadata record comprises a media stream identifier.

The method may further comprise receiving a metadata item corresponding to at least one media frame; and updating the metadata record for the at least one media frame.

In some cases, the metadata item corresponds to two or more media frames associated with two or more media streams.

In some cases, the two or more media frames share a common timecode reference.

In some cases, the metadata item is received from a control station.

In some cases, each of the plurality of media streams has a media stream identifier associated therewith.

In some cases, the plurality of media frames is associated with the respective media stream when it is stored.

The method may further comprise generating a unique identifier for each media frame.

In some cases, the timecode is identified from the media stream.

In some cases, the plurality of media sources comprises at least one camera.

In some cases, the plurality of media sources comprises at least one media encoder.

In some cases, the plurality of media streams are live streams.

The method may further comprise: receiving a request for at least one media clip from a control station; retrieving the at least one media clip in response to the request; and transmitting the at least one media clip to an output node identified in the request.

In some cases, the at least one media clip comprises two or more selected media clips associated with two or more media streams.

In some cases, the timecodes of the selected media clips are referenced to a common time base.

In some cases, respective media frames of the selected media clips share a common timecode reference.

In some cases, the output node is at the control station.

In some cases, the output node is at a second storage server

In some cases, the second storage server is a remote storage server.

The method may further comprise: receiving a request for at least one proxy media clip from a control station; retrieving at least one media clip that corresponds to the at least one proxy media clip in response to the request; transcoding the at least one media clip to generate the at least one proxy media clip; and transmitting the at least one proxy media clip to an output node identified in the request.

In some cases, the request identifies the at least one media clip.

In some cases, the request comprises one or more requested timecode references corresponding to the at least one media clip.

In some cases, the request comprises a requested media stream identifier corresponding to the media stream of the at least one media clip.

In some cases, the request is received via a control network.

In some cases, the control network is a part of the data network.

In another broad aspect, there is provided a method of managing media clips over a data network, the method comprising: receiving a plurality of media streams from a storage server via the data network, wherein each of the plurality of media streams comprises a plurality of media frames, wherein each of the plurality of media streams has a timecode; displaying a first media stream of the plurality of media streams; and displaying at least one additional media stream of the plurality of media streams.

In some cases, the first media stream is displayed in a first viewport on a display, and wherein the at least one additional media stream is displayed in at least one additional viewport on the display.

In some cases, the first media stream is displayed in synchronization with the at least one additional media stream, based on respective timecodes of the first media stream and the at least one additional media stream.

In some cases, the first media stream is displayed in a first viewport on the display, wherein the at least one additional media stream is also displayed in the first viewport, and wherein the at least one additional media stream is displayed while maintaining continuity with the first media stream based on respective timecodes of the first media stream and the at least one additional media stream.

In some cases, arrangement of the first viewport and the at least on additional viewport is configurable by a user.

The method may further comprise displaying at least one user interface element on the display.

In some cases, the at least one user interface element is configurable by a user.

In some cases, the at least one user interface element is a metadata editing interface.

In some cases, the at least one user interface element is a clip viewing interface.

In some cases, the at least one user interface element is a live stream viewing interface.

The method may further comprise: receiving an input via an input device; associating the input with at least one timecode reference of each of the first media stream and the at least one additional media stream; generating a metadata update request based on the input and the at least one timecode reference; transmitting the metadata update request to a metadata database.

In some cases, the at least one timecode reference is a current timecode reference corresponding to a selected media frame currently displayed on the display.

The method may further comprise: receiving a search input via the input device, wherein the search input identifies at least one metadata item; transmitting a clip request to the metadata database based on the at least one metadata item; receiving at least one media frame identifier in response to the clip request; and requesting at least one media clip from the storage server based on the at least one media frame identifier.

In some cases, the at least one media frame identifier comprises one or more timecode references associated with the at least one media clip.

In yet another broad aspect, there is provided a system for managing media clips, the system comprising: a data network; a plurality of media sources; a storage server configured to: receive a plurality of media streams from the plurality of media sources; and for each of the plurality of media streams, wherein each of the plurality of media streams comprises a plurality of media frames: determine a timecode for each of the plurality of media streams, the timecode comprising a plurality of timecode references to the plurality of media frames; and store the plurality of media streams, wherein the plurality of media frames are retrievable over the data network based on at least one selected timecode reference.

In some cases, the plurality of media streams are received via the data network.

The system may further comprise a metadata server configured to generate a metadata record associated with the plurality of timecode references in a metadata database.

In some cases, metadata record comprises a media stream identifier.

In some cases, the metadata server is further configured to receive a metadata item corresponding to at least one media frame; and update the metadata record for the at least one media frame.

In some cases, the metadata item corresponds to two or more media frames associated with two or more media streams.

In some cases, the two or more media frames share a common timecode reference.

The system may further comprise a control station, wherein the metadata item is received from the control station.

In some cases, each of the plurality of media streams has a media stream identifier associated therewith.

In some cases, the plurality of media frames is associated with the respective media stream when it is stored.

In some cases, the storage server is further configured to generate a unique identifier for each media frame.

In some cases, the timecode is identified from the media stream.

In some cases, the plurality of media sources comprises at least one camera.

In some cases, the plurality of media sources comprises at least one media encoder.

In some cases, the plurality of media streams are live streams.

In some cases, the storage server is further configured to: receive a request for at least one media clip from a control station; retrieve the at least one media clip in response to the request; and transmit the at least one media clip to an output node identified in the request.

In some cases, the at least one media clip comprises two or more selected media clips associated with two or more media streams.

In some cases, the timecodes of the selected media clips are referenced to a common time base.

In some cases, respective media frames of the selected media clips share a common timecode reference.

In some cases, the output node is at the control station.

In some cases, the output node is at a second storage server

In some cases, the second storage server is a remote storage server.

In some cases, the storage server is further configured to: receive a request for at least one proxy media clip from a control station; retrieve at least one media clip that corresponds to the at least one proxy media clip in response to the request; transcode the at least one media clip to generate the at least one proxy media clip; and transmite the at least one proxy media clip to an output node identified in the request.

In some cases, the request identifies the at least one media clip.

In some cases, the request comprises one or more requested timecode references corresponding to the at least one media clip.

In some cases, the request comprises a requested media stream identifier corresponding to the media stream of the at least one media clip.

The system may further comprise a control network, wherein the request is received via the control network.

In some cases, the control network is a part of the data network.

In yet another broad aspect, there is provided a system for managing media clips, the system comprising: a data network; a storage server; a control station, the control station configured to: receive a plurality of media streams from the storage server via the data network, wherein each of the plurality of media streams comprises a plurality of media frames, wherein each of the plurality of media streams has a timecode; display a first media stream of the plurality of media streams; and display at least one additional media stream of the plurality of media streams.

In some cases, the first media stream is displayed in a first viewport on a display of the control station, and wherein the at least one additional media stream is displayed in at least one additional viewport on the display.

In some cases, the first media stream is displayed in synchronization with the at least one additional media stream, based on respective timecodes of the first media stream and the at least one additional media stream.

In some cases, the first media stream is displayed in a first viewport on the display, wherein the at least one additional media stream is also displayed in the first viewport, and wherein the at least one additional media stream is displayed while maintaining continuity with the first media stream based on respective timecodes of the first media stream and the at least one additional media stream.

In some cases, arrangement of the first viewport and the at least one additional viewport is configurable by a user.

In some cases, the control station is further configured to display at least one user interface element on the display.

In some cases, the at least one user interface element is configurable by a user.

In some cases, the at least one user interface element is a metadata editing interface.

In some cases, the at least one user interface element is a clip viewing interface.

In some cases, the at least one user interface element is a live stream viewing interface.

The system may further comprise a metadata server, wherein the control station may be further configured to: receive an input via an input device; associate the input with at least one timecode reference of each of the first media stream and the at least one additional media stream; generate a metadata update request based on the input and the at least one timecode reference; transmit the metadata update request to the metadata server.

In some cases, the at least one timecode reference is a current timecode reference corresponding to a selected media frame currently displayed on the display.

In some cases, the control station is further configured to: receive a search input via the input device, wherein the search input identifies at least one metadata item; transmit a clip request to the metadata database based on the at least one metadata item; receive at least one media frame identifier in response to the clip request; and request at least one media clip from the storage server based on the at least one media frame identifier.

In some cases, the at least one media frame identifier comprises one or more timecode references associated with the at least one media clip.

BRIEF DESCRIPTION OF THE DRAWINGS

A preferred embodiment of the present invention will now be described in detail with reference to the drawings, in which:

FIGS. 9A to 9D illustrate a sequence of video frames in accordance with one embodiment;

FIGS. 10A to 10D illustrate a sequence of video frames in accordance with another embodiment;

FIGS. 11A to 11D illustrate a sequence of video frames in accordance with another embodiment; and FIGS. 12A to 12D illustrate a sequence of video frames in accordance with another embodiment.

Figure 1A:
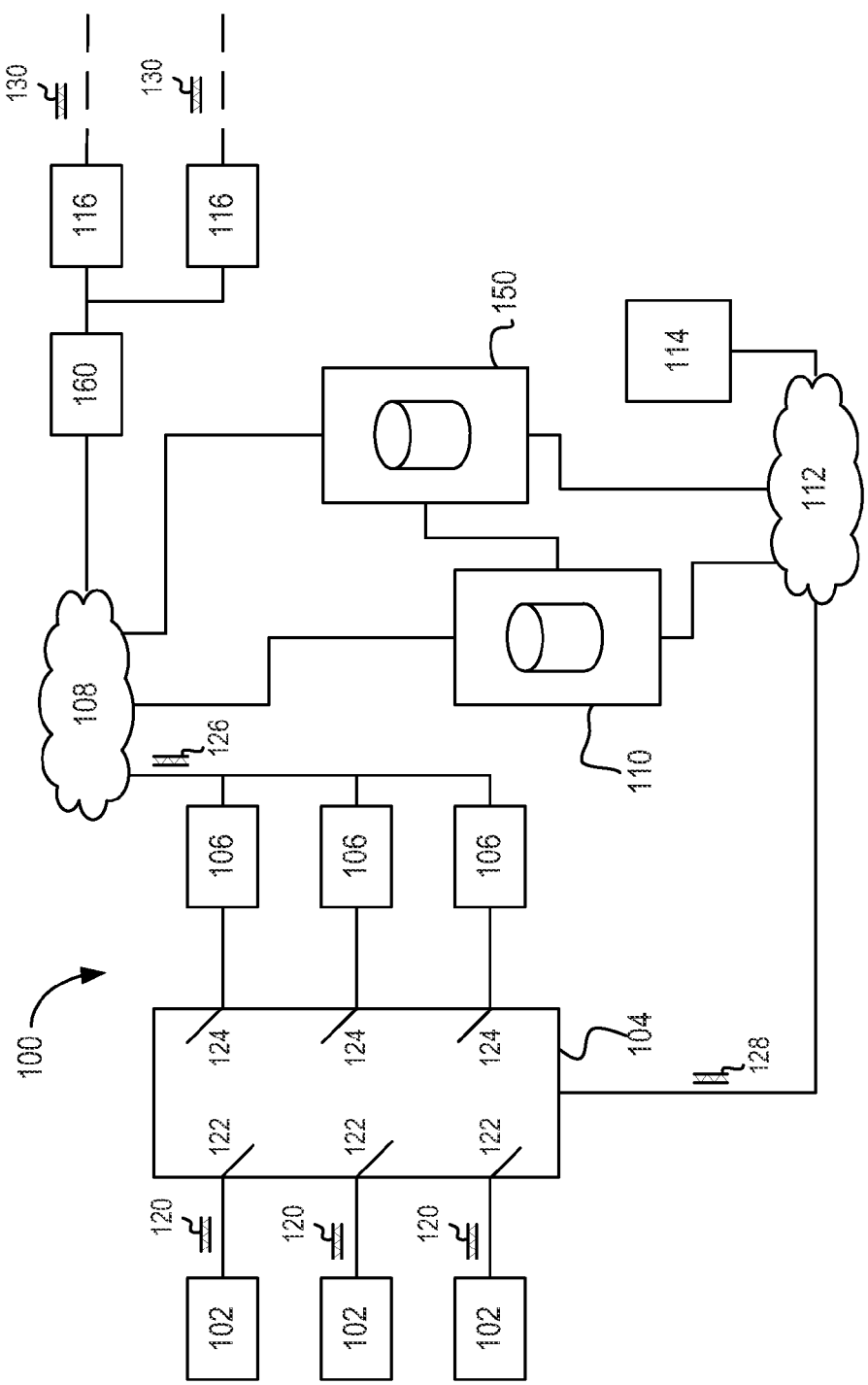
FIG. 1A illustrates an exemplary system 100 for generating and managing media objects.

It will be appreciated that for simplicity and clarity of illustration, where considered appropriate, reference numerals may be repeated among the figures to indicate corresponding or analogous elements or steps.

Description of Exemplary Embodiments

The embodiments of the systems and methods described herein, and their component nodes, devices and operations, may be implemented in hardware or software, or a combination of both.

Reference is first made to FIG. 1A, which illustrates an exemplary system 100 for generating and managing media objects, including media streams and media clips. System 100 comprises a plurality of media sources 102, a media router 104, a plurality of encoders 106, a data network 108, a storage server 110, a metadata server 150, a control network 112 (which may be part of data network 108), a control station 114, an output node 160 and a plurality of decoders 116.

Media sources 102 may comprise sources of video or audio that produce respective media signals 120. For example, a media source 102 may be a television camera or film camera, which may produce a video output signal, which may be transmitted using a Serial Digital Interface (SDI) or High Definition Serial Digital Interface (HD-SDI). In some cases, a media source 102 may comprise a plurality of input interfaces; for example, to receive video input with a 4K resolution, several SDI inputs may be grouped together. Media source 102 may also be an audio capture device, such as a microphone, which may produce an audio output signal, transmitted via a suitable interface.

Other types of media sources 102 may also be provided. For example, media sources 102 may comprise a network file server or media servers.

In some cases, particularly where there are a plurality of media sources 102 capturing video of a live event, the media sources 102 may be synchronized relative to a common timebase (e.g., using a GPS-based clock, a reference timing signal, etc.) and timecodes may be generated and embedded within the media signals 120 to provide common references if and when the media signals are later edited.

Many forms of timecodes can be provided. The Society of Motion Picture and Television Engineers (SMPTE) defines multiple timecode standards. For example, a video signal may have Vertical Interval Time Codes or "VITC" timecodes embedded within the vertical blanking interval. In some cases, the term "timecode" or "time code" may refer to a plurality of timecode packets associated with a particular video stream. Each timecode packet may correspond to a particular frame of video, and the timecode packets may be collectively referred to as the "timecode" of the stream. A timecode reference may be a timing reference associated with a particular point in time, as referenced to the timecode of the stream.

Media router 104 generally has a plurality of input ports 122 and output ports 124. Each of the media sources 102 may provide a media signal 120 (e.g., video and/or audio) to media router 104 at one of the input ports 122, for example using an SDI interface. Media router 104 may be configured to switch signals received at an input port 122 to an output port 124 under the control of control network 112. Media router 104 can be coupled to control station 114 to receive router control signals 128.

A media encoder 106 is coupled to each of the output ports 124 of media router 104. Each media encoder may receive an input media signal (e.g., video input signal) and encode it to provide a corresponding encoded media stream (e.g, compressed digital video signal) 126.

When encoding the media stream, media encoder 106 may extract timecode packets embedded within the input media signal and re-embed corresponding timecode packets in the encoded media stream. The embedded timecode packets may be associated with each individual media frame, or may be inserted in the media stream at predefined intervals. In some cases, additional timecode packets may be generated and embedded based on timecode references from existing timecode packets and a known frame rate of the media stream.

Media encoders 106 can be coupled to data network 108. Data network 108 may be any type of communication network that allows data to be transmitted between various devices. In this example, data network 108 is an Internet Protocol (IP) network that may be used to couple devices in addition to those illustrated in the Figures and described herein. Accordingly, media encoders 106 may be configured to generate and output a media stream for transmission via data network 108. Media streams may comprise, for example, a Motion Picture Experts Group (MPEG) Transport Stream according to the MPEG-2 or other standards. Similarly, the media streams generally comprise media frames (e.g., video frames or audio frames) encoded in a media compression format, such as that defined in the MPEG-2, MPEG-4 or JPEG2000 standards.

Media frames may be generally intra coded frames, that is, frames coded without reference to any other frame except themselves, to facilitate random access to any point in the respective media streams. However, in some cases, frames may also be predicted frames. For example, if media frames are encoded in the MPEG-4 Advanced Video Coding standard, then the media frames may be generally of the I-frame type. However, in some cases, the media frames may also comprise P- or B-frames.

In some embodiments, media router 104 may be omitted and media sources 102 may be otherwise directly or indirectly coupled to data network 108, whereupon the media sources 102 may perform the function of media encoders 106 or interface directly with media encoders 106.

The media streams 126 can be transmitted to storage server 110 via data network 108 for storage. Storage server 110 may comprise one or more computer servers, each comprising at least a processor, a network interface and a storage memory. In particular, storage server 110 may be configured to provide a scalable distributed storage system (e.g., "cloud" storage) in which storage server 110 comprises multiple nodes or computers connected via a network. For example, storage server 110 may be configured to provide a NoSQL database storage scheme. In some embodiments, storage server 110 may comprise one or more encoders 106, for encoding or re-encoding input media streams.

Each of the media streams may be stored in a separate file or record by storage server 110. A media stream identifier may be generated and associated with each stored media stream. In some cases, the media stream identifier may be a randomly generated unique identifier, such as a universally unique identifier (UUID). In other cases, the media stream identifier may identify, for example, the media source from which the media stream originated. The media stream identifier may also identify a date and time associated with the media stream, or other metadata.

Generally, the transport stream of a media stream may be removed when stored by storage server 110. However, in some cases, the transport stream may be retained.

Metadata server 150 may comprise a processor, a network interface and a storage memory. The storage memory may comprise a metadata database, which may in some cases be a relational database configured to store metadata relating to the media streams stored by storage server 110.

The metadata database may contain records corresponding to each of the media streams stored. The records may identify, for example, the media source from which the media stream originated, a date and time associated with the media stream, encoding format and other metadata. The metadata database may also generate and associate unique identifiers with each media frame in the respective media streams. Each record may comprise a description field that can store arbitrary text or tags describing the recorded content, to facilitate searching and retrieval (e.g., by a human operator). For example, if a metadata stream comprises media frames that record a touchdown scored by John Smith in a football game, then metadata records for the media frames may comprise metadata such as "touchdown", "$4^{th}$ quarter", "player number 33", "Smith, John", "Green Bay", etc. For media clips, additional metadata may include a clip author, a real time creation date, a timecode creation time, in/out points for the clip, a clip name, an identifier of the machine on which the clip was created, a primary media source from which the clip was created, etc.

In general, the metadata database may be searchable, for example, from control station 114 via a suitable search interface.

It will be appreciated that any number of metadata tags or descriptions can be applied, although in some cases these may be limited to certain predefined tags to enforce uniformity.

In some embodiments, every media frame of every media stream may have a corresponding record in the metadata database. The frame record may comprise, for example, a timing reference identified in the timecode packet of the media frame and a media frame identifier for retrieving the media frame from storage server 110 (e.g., byte offset, file offset, timecode offset, frame number, etc.).

The metadata database may further contain records defining media clips. Media clips may be created and edited, for example, by control station 114. Each media clip record may contain an indication of the media stream and media frames that comprise the media clip. The record may be constructed based on timecode references of media frames, references to specific frames (e.g., by frame count). Moreover, each media clip record may refer to more than one media stream.

In some embodiments, media clip records may contain additional metadata relating to cropping bounds, zoom level, control points (e.g., in x and y coordinates), and object identifiers, as described herein with reference to FIGS. 9A to 12D.

In some cases, media clips may reference other media clips.

Accordingly, when a media clip is to be played back or otherwise output, the requesting control station may first query the metadata database to retrieve the media clip record, identify the media streams and media frames required to construct the media clip, and subsequently request the corresponding media frames from storage server 110. The received media frames can then be assembled in the appropriate sequence and transformations such as cropping and panning applied (indicated in the media clip record) prior to output or playback.

In some embodiments, storage server 110 and metadata server 150 may be merged, or provided at the same physical device. For example, storage server 110 may perform some or all of the functions of metadata server 150, or vice versa.

Output node 160 is generally capable of retrieving or receiving media frame data from storage server 110 (e.g., media streams or media clips), and generating an output video stream, for example, to be broadcast. For example, output node 160 may mix and blend between two media streams (e.g., performing cross-fading). In some embodiments, output node 160 may apply cropping (or zooming) and panning when generating the output video stream. In some embodiments, output node 160 may comprise one or more decoders 116. In addition, in some embodiments, output node 160 may be provided as part of control station 114 or at other locations in the system. Output node 160 may in some cases be referred to as a playout node.

Control station 114 may comprise one or more computing devices comprising a processor, a memory, a display, a network interface and an input device capable of being operated by a user. For example, control station 114 may be a computer workstation, a laptop computer, a tablet computer, etc. Control station 114 can be communicatively coupled to storage server 110 through control network 112. As noted above, in some cases control network 112 may be part of another network, such as data network 108. In such cases, control station 114 may be located remotely from storage server 110 and communicatively coupled via the data network (e.g., the Internet). As noted above, in some cases, control station 114 may comprise an output node 160 (not shown).

Generally, the user may use control station 114 to select media streams, or portions thereof, stored in the storage server 110, as described herein. The user may also use the control station 114 to review the media streams, select portions of the media streams (e.g., media clips) and retrieve or record the selected portions of the media streams as media clips. The user may further direct that selected media streams or clips be output to an output node 160. In some cases, media clips may be stored in the storage server 110 as separate media objects copied from the media streams. Preferably, media clips need not be copied and stored separately from the media streams, but can instead be referenced according to start and stop time markers indicating the start and end positions of the clip in the media stream. In particular, the start and stop time markers may be timing references based on a timecode (timecode reference) embedded within the media streams. As described, such timing references and timecodes can be synchronized among two or more media streams stored at the storage server 110, allowing for convenient retrieval of media frames corresponding to the same timecode. Additional uses of control station 114 are described herein with reference to FIGS. 9A to 12D.

Accordingly, when a request for a media clip is received by storage server 110, storage server 110 can determine the relevant media streams and timecode references from the request and the start and stop time markers identified in the request, retrieve the relevant media clip and transmit the requested media clip to the requesting device, or to another device specified in the request.

In particular, media clips may be output to output nodes 160 coupled to data network 108. For example, in system 100, decoders 116 can receive media clips from storage server 110 through the data network via output node 160. The decoders 116 can be configured to decode the media clips to provide decoded media clips 130 to devices coupled to the decoders. For example, if a media clip is encoded in the MPEG-4/AVC compression format, decoder 116 can decode the media clip and generate a corresponding SDI or HD-SDI output signal.

Similarly, renderers (not shown) can be coupled to data network 108 and can also receive media clips from storage server 110 through the data network. The renderers can be configured to decode the media clips and render the media clips for display on a display, such as a television, a computing device or the like. In some cases, renderers can be provided in software or hardware at control station 114. For example, one renderer may comprise video streaming software.

In general, a user may use the control station 114 to select a series of media clips and arrange them in a sequence, which may be recorded as a single clip or which may be recorded as metadata indicating the source media stream for each clip in the sequence, along with the start and stop point within the source media stream for each clip in the sequence. The sequence of clips may be output to devices coupled to the data network 108, including the decoders 116 and renderers 117.

In some embodiments, the system may include optional devices coupled to the storage server 110 or control station 114. For example, such devices may include a viewing system that allows a user of the viewing system to view one or more media streams or media clips stored in the storage server 110. Other such devices may include a replay clip management system or a router control system, as described further herein.

Generally, system 100 allows input media signals (e.g., source video signals) to be received and encoded in a form that may be transmitted using data network 108. Following encoding, media streams (and clips from the media streams) are accessible to devices coupled to the video server 110. In this example, by selecting data network 108 to be an IP network, it is possible to allow a variety of devices capable of communicating using an IP network to access the media streams and clips.

In some embodiments, the data network 108 may be a local area network (LAN) in a facility such a sports arena. In such an embodiment, the media sources 102 may be video cameras located in the arena and possibly other locations. The decoders 116 may be coupled to video displays (not shown) such as a display visible to spectators in the arena, including the stadium score clock or other digital display signs. In some embodiments, one or more of the decoders may be part of a display controller (not shown) controlled by a spectator. For example, a television set top box may be coupled to the data network 108 (e.g., via the Internet). The set top box may include software allowing the spectator to select video objects (including media streams and media clips) stored in the video server. The set top box obtains the selected media from the storage server 110. A decoder in the set top box decodes the selected media to form decoded videos, which are then shown a display (not shown).

Figure 1B:
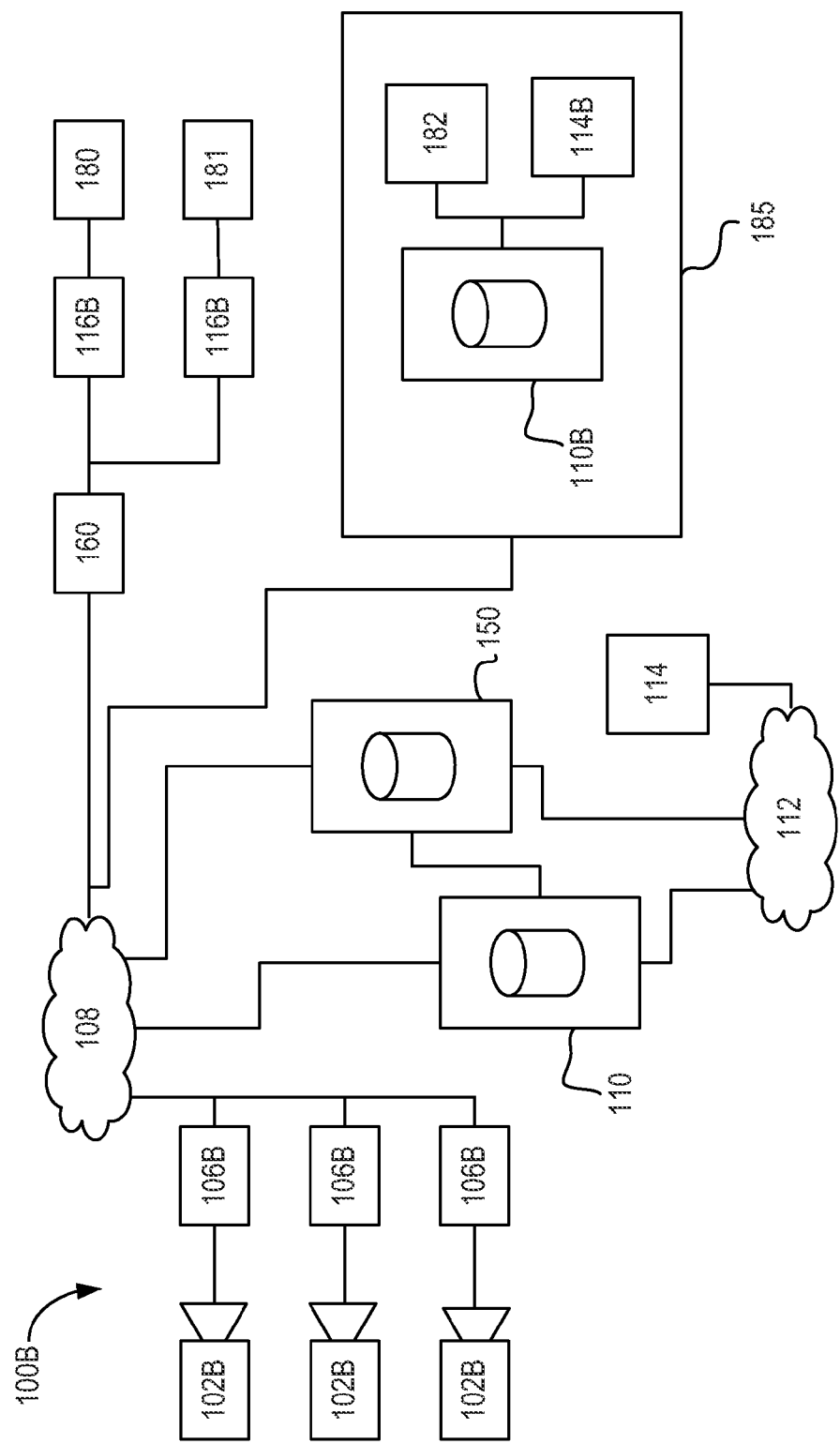
FIG. 1B illustrates an exemplary embodiment of the system of FIG. 1A.

Reference is next made to FIG. 1B, which illustrates an exemplary embodiment of the system of FIG. 1A. Elements of system 100B that correspond to elements of system 100 are identified by similar reference numerals. System 100B may be deployed, for example, at a sports stadium, and generally comprises a data network 108, a storage server 110, a metadata server 150, a control network 112, and a control station 114. Media sources 102B may be video cameras producing video signals to be encoded by encoders 106B. Similarly, video may be output via output node 160 and further via decoders 116B to a stadium clock scoreboard 180 and digital signage 181 located throughout the stadium. System 100B further comprises a secondary storage server 110B, a secondary controller 114 and a display 182, which may be located in a broadcasting suite 185.

Figure 1C:
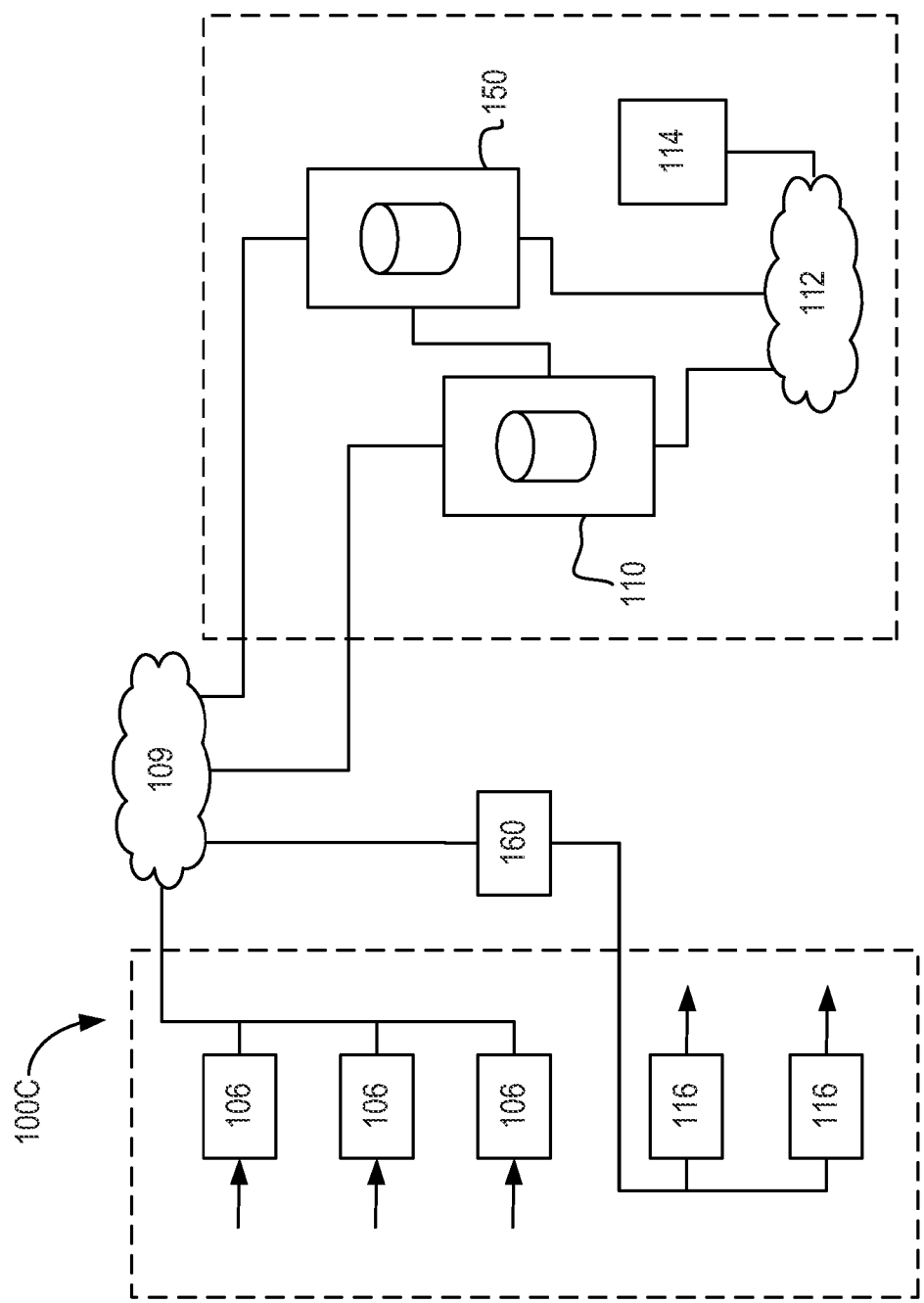
FIG. 1C illustrates another exemplary embodiment of the system of FIG. 1A.

Reference is next made to FIG. 1C, which illustrates another exemplary embodiment of the system of FIG. 1A. Elements of system 100C that correspond to elements of system 100 are identified by similar reference numerals. System 100C may generally comprise a storage server 110, a metadata server 150, a control network 112, and a control station 114. In contrast to system 100, system 100C may comprise a hybrid data and control network cloud 109, which connects the storage server 110 and metadata server 150 to encoders 106 and decoders 116. Optionally, an output node 160 may be provided. The hybrid network may be a public or private data network, through which input data can be transmitted to the storage server 110 for management by control station 114, whereupon it can be transmitted back to decoders 116. Accordingly, storage server 110, metadata server 150 and control station 114 can be located remotely from both encoders 106 and decoders 116.

Figure 1D:
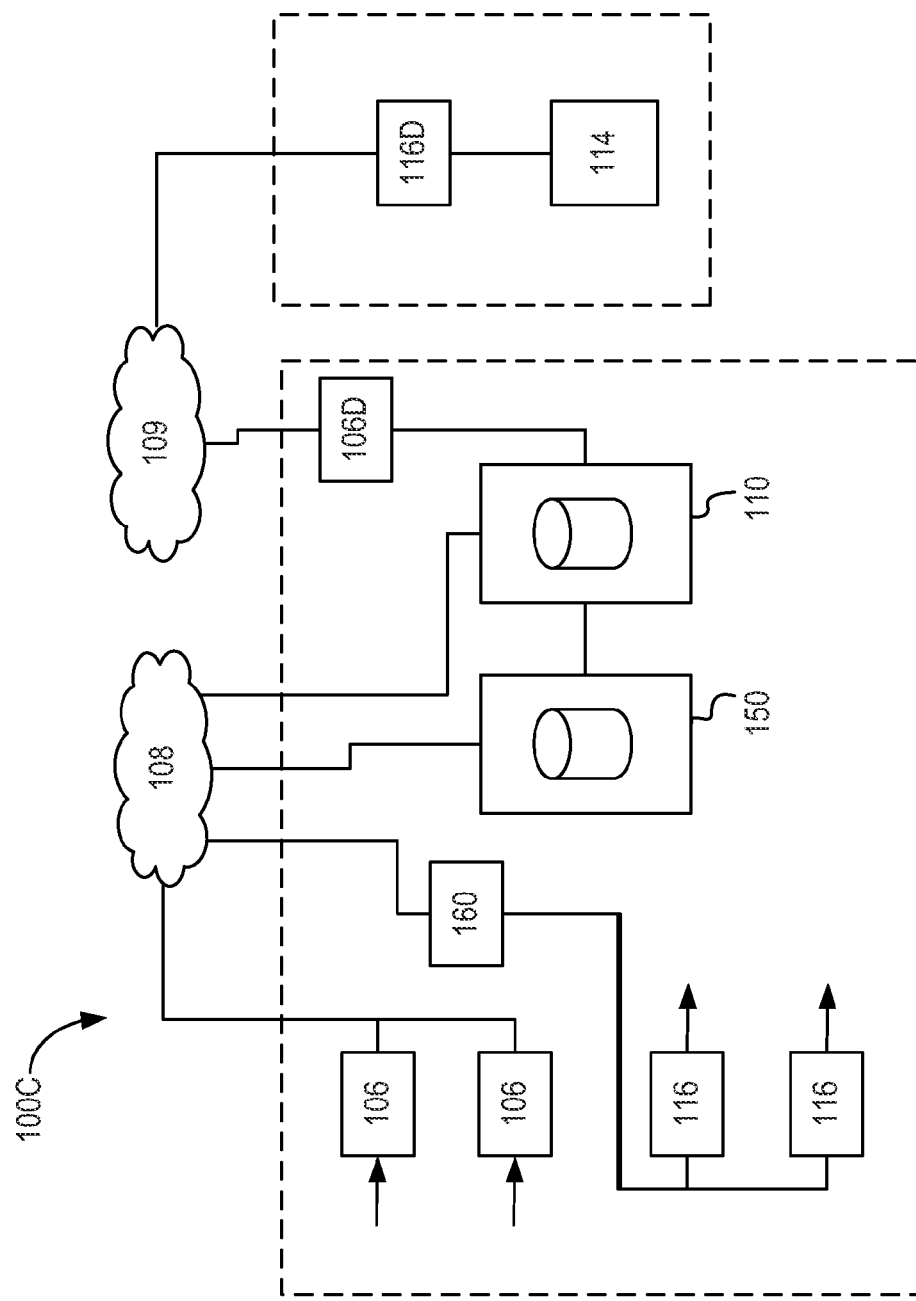
FIG. 1D illustrates an alternative exemplary embodiment of the system of FIG. 1C.

Reference is next made to FIG. 1D, which illustrates an alternative exemplary embodiment of the system of FIG. 1C. Elements of system 100D that correspond to elements of system 100C are identified by similar reference numerals. System 100C may generally comprise a storage server 110, a metadata server 150, a control network 112, and a control station 114. System 100D may comprise a hybrid data and control network cloud 109, which connects the control station 114 to storage server 110 and metadata server 150. Optionally, an output node 160 may be provided. The hybrid network may be a public or private data network, through which input data can be transmitted to the storage server 110 for management by control station 114. Output data from storage server 110 may be encoded using encoder 116D to generate proxy media streams and proxy media clips, for more efficient transmission via the hybrid network 109. The proxy media streams and proxy media clips can be decoded by decoder 116D for display at control station 114. Accordingly, storage server 110 and metadata server 150 can be located in close proximity to encoders 106 or decoders 116, or both, while control station 114 can be located remotely from encoders 106, decoders 116, storage server 110 and metadata server 150.

Figure 2:
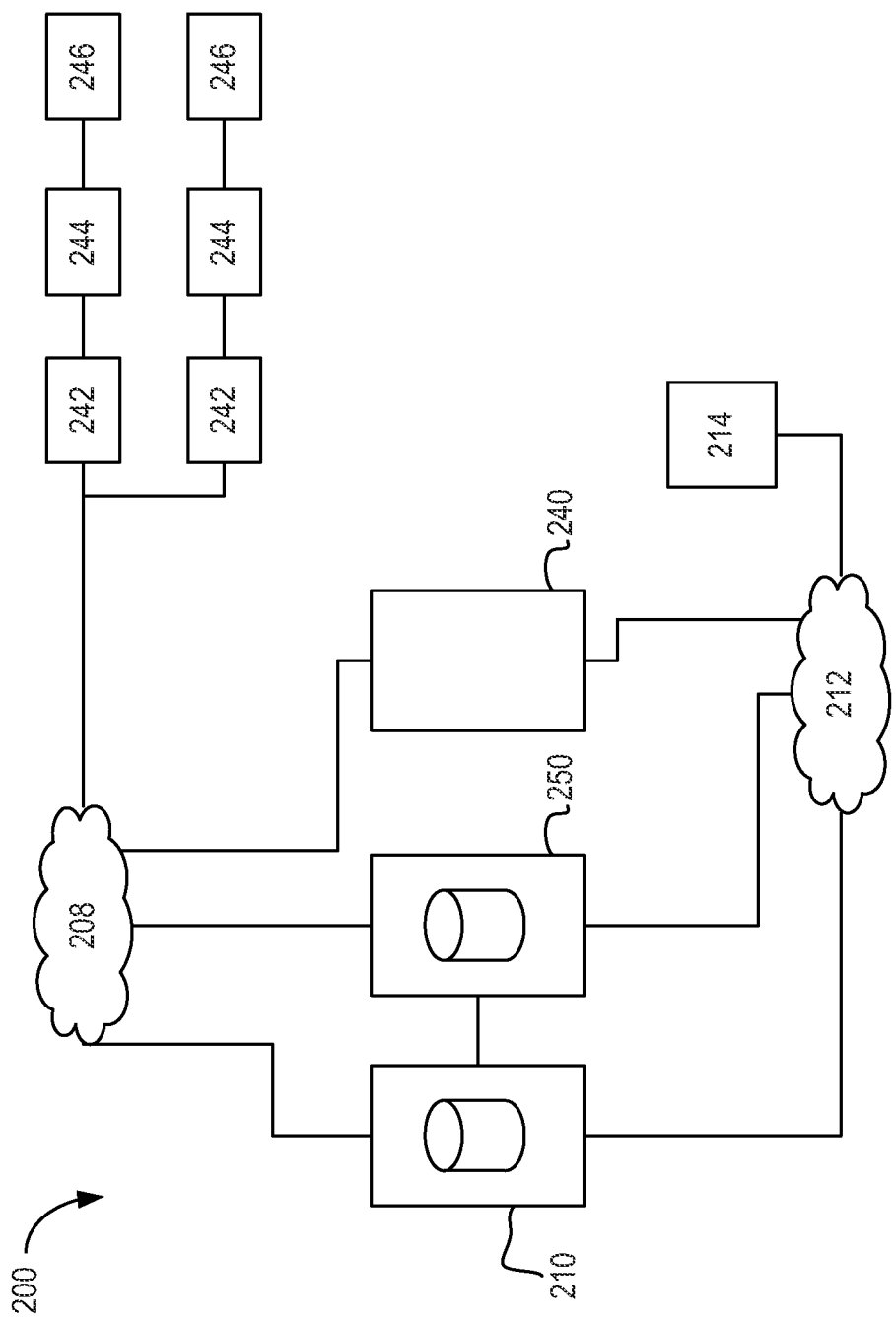
FIG. 2 illustrates an exemplary system 200 for using media objects.

Reference is next made to FIG. 2, which illustrates an exemplary system 200 for using media objects such as media streams and media clips stored in a storage server. Elements of system 200 that correspond to elements of system 100 are identified by similar reference numerals. System 200 generally comprises a data network 208, a storage server 210, a metadata server 250, a control network 212, a control station 214, a web server 240 and media viewing controller 242.

The media objects may be recorded in storage server 210 by a system such as system 100.

Web server 240 and media viewing controller 242 are coupled to data network 108 and may communicate with each other and with storage server 210 through the data network.

Web server 240 provides an interface for media viewing controllers 242 to access media clips and other media objects stored in video server 210. Web server provides a web site in the form of web pages accessible to media viewing controller 242. Each media viewing controller includes a decoder 244 that is coupled to a display 246. The web pages allow a user of the media viewing controller to identify media objects (including media streams and media clips made by a user of control station 214) stored in the storage server 210 and select them for viewing. The selected media objects are then transmitted through the data network to the decoder 244, which decodes them to provide decoded media (e.g., video signals) that are then shown on the display 246.

In some embodiments, a user of a media viewing controller may be permitted to make media clips from the received media objects.

In some embodiments, the data network 208 may be a local area network (LAN) within a single facility. In other embodiments, the data network may be a wide area network that includes public networks such as the Internet. The media viewing controller 242 may be located anywhere that the data network extends, and could potentially be located anywhere in the world. For example, a media viewing controller 242 may be a computer coupled to the Internet. A user of the computer may identify media objects stored in the storage server and may view the media objects on the user's own computer. This allows the user to view media objects of interest to the user.

Figure 3:
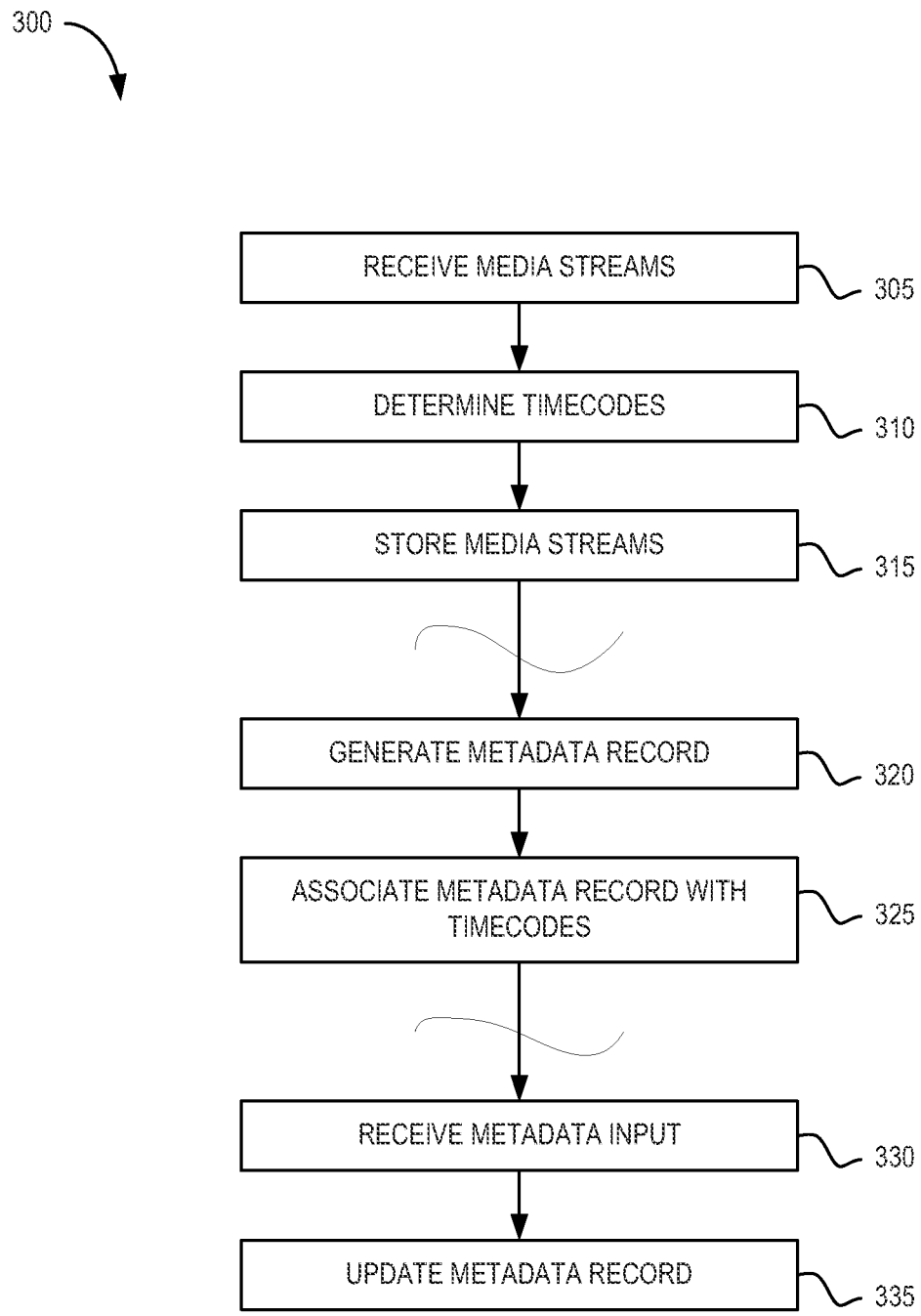
FIG. 3 is an exemplary process flow diagram for a method of managing media clips over a data network.

Referring now to FIG. 3, there is illustrated an exemplary process flow diagram for a method of managing media clips over a data network. Method 300 may be performed, for example, by system 100 and by storage server 110 in particular.

At 305, a plurality of media streams may be received from a plurality of media sources (e.g., media sources 102). The media streams may be received directly from the media sources, or indirectly via a router (e.g., router 104) and encoders (e.g., encoders 106). Each of the plurality of media streams may comprise a plurality of media frames, respectively.

At 310, one or more timecodes may be extracted from, or otherwise determined for, each of the plurality of media streams. The timecodes for each of the media steams may also be referenced to a common timebase, allowing for synchronization between the plurality of media streams. In cases where the media streams originate from media sources that are synchronized (e.g., television cameras that are synchronized to a common reference clock), the timecodes may already be referenced to the same common timebase (i.e., synchronized). In other cases, where the media streams originate from media sources that may not be synchronized (e.g., television cameras at disparate locations), then an offset may be determined for one or more of the media streams, allowing the respective timecodes to be referenced to the common timebase. The offset may be automatically determined, if possible, or otherwise may be manually determined based on user input.

The media streams may be stored at a storage server at 315. For example, the media streams may be stored at a storage server 110 as described herein with reference to FIG. 1A. Generally, the media streams are stored in such a manner that their respective media frames can be retrieved over the data network, based on a timecode or other frame identifier.

At 320, a metadata record can be generated corresponding to each of the plurality of media streams. The metadata record can be generated and stored in a metadata database, for example at metadata server 150.

At 325, the generated metadata record can be associated with a respective media stream. In addition, the metadata record can be updated to comprise an indication of the timecodes extracted from within the corresponding media stream. In some cases, metadata records for each individual media frame with the media stream may be generated to comprise individual timecode references specific to the media frame.

For each media stream, the metadata record may further comprise an indication of the media source of the media stream and other metadata as described herein.

Optionally, at 330, metadata item or input may be received, for example from control station 114. Accordingly, the metadata record can be updated with the metadata input at 335.

Figure 4:
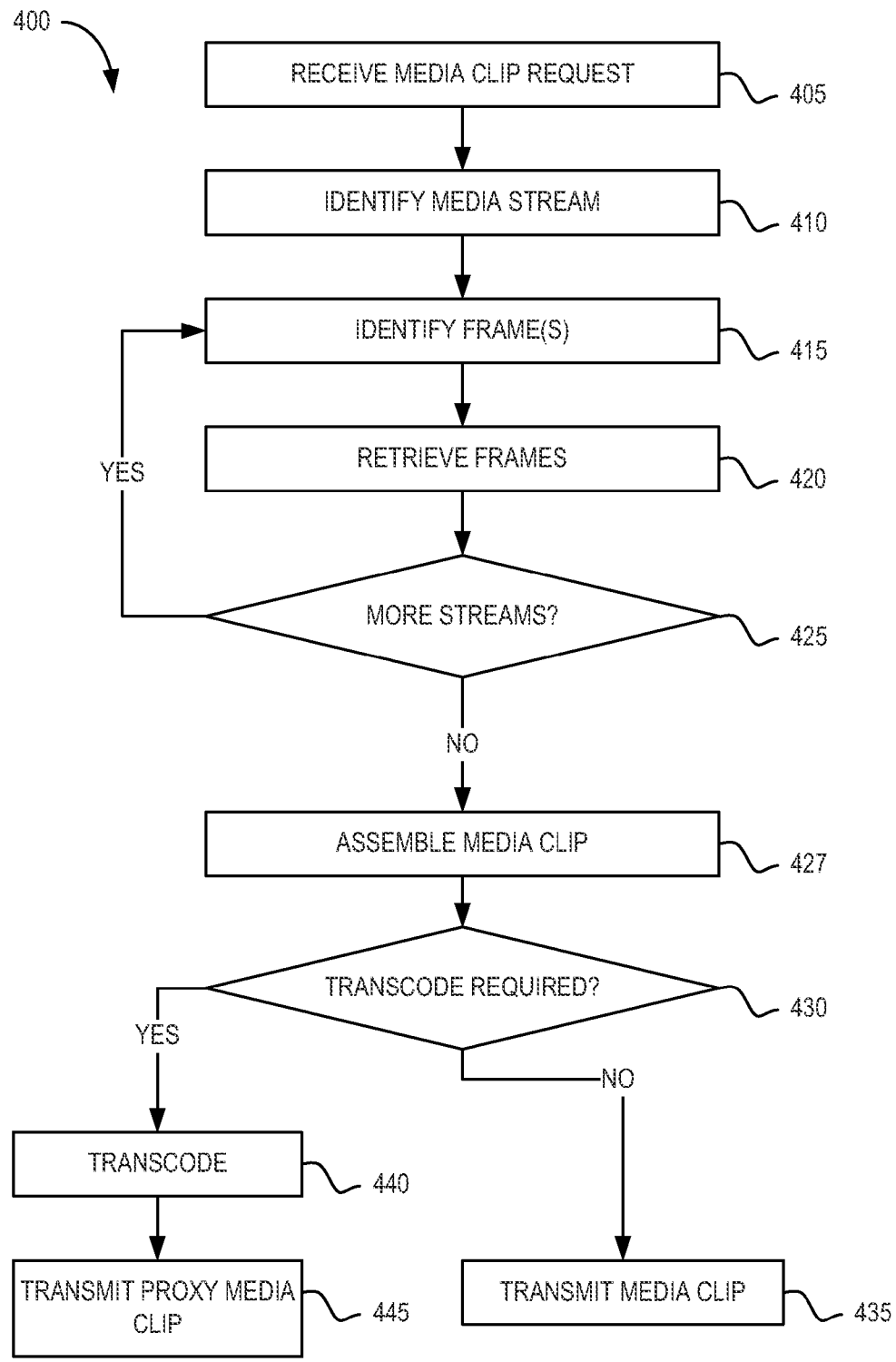
FIG. 4 is a process flow diagram for an exemplary method of providing media clips.

Referring now to FIG. 4, there is illustrated a process flow diagram for an exemplary method of providing media clips. Method 400 may be performed by a storage server, such as storage server 110.

At 405, a media clip request may be received by the storage server via control network 112 (or, in some cases, data network 108). The media clip request may originate, for example, at control station 114 or output node 160, and may comprise an indication of the destination of the requested media (e.g., output node 160 and/or control station 114), the media stream or plurality of media streams requested, as well as indications of the requested media frames. For example, the indications may be timecode references (if known), a byte offset within the respective stored media stream (if the byte offset is known), cropping bounds, zoom levels, control points, object identifiers, etc. In some cases, a range of media frames may be requested according to a start and stop time in a media stream.

At 410, a requested media stream is identified based on the media clip request. Likewise, at 415, the requested media frames within the requested media stream are identified.

The requested media frames can be extracted from the stored media stream at 420.

At 425, a determination can be made whether there exist additional requested media frames belonging to additional media streams. If additional media frames are required, the process may return to 415 to identify the additional media frames and repeat the extraction process. This loop can be repeated until all requested media frames from all requested media streams have been extracted.

Once the requested media frames from the requested media streams have been extracted and retrieved, a media clip can be assembled at 427. The media frames may be arranged to assemble the media clip according to instructions contained in the media clip request. In some cases, the media frames may simply be concatenated together. In other cases, the media frames may be arranged in a specific arrangement, as described further herein. In still other cases, the media clip may be assembled at an output node, such as output node 160.

In some cases, the requested media clip may comprise media frames encoded in a high resolution and/or high bitrate encoding format, which may result in a requirement for large bandwidth to transmit the resulting media clip over the data network. In such cases, a proxy media clip may be generated, created by transcoding the media clip to a lower resolution or bitrate.

In such cases, at 430, a determination may be made whether transcoding is required before transmitting the media clip. The determination may be based on a bandwidth policy, on the media clip request itself, or other factors.

Transcoding may be performed, if required, at 440 and the resulting proxy media clip transmitted to an output specified in the request at 445.

Otherwise, if transcoding is not required, the retrieved media clip may be transmitted to the output specified in the request, at 435.

The output specified in the request may be, for example, an output node 160, or the control station 114 from which the request originated. Alternatively, the output may be another control station 114. In some cases, the output may also be another network output. In some cases, the network output may be another storage server 110 accessible via network 108. For example, if a first storage server 110 is located at a sports stadium, the output may be a second storage server 110 located in a television broadcast facility.

In some cases, the network output may be a personal computer or tablet computer accessible via the Internet.

In some other cases, the output may comprise a plurality of outputs grouped together to provide a common interface. For example, to provide video output with a 4K resolution, multiple SDI output channels can be grouped together.

Figure 5:
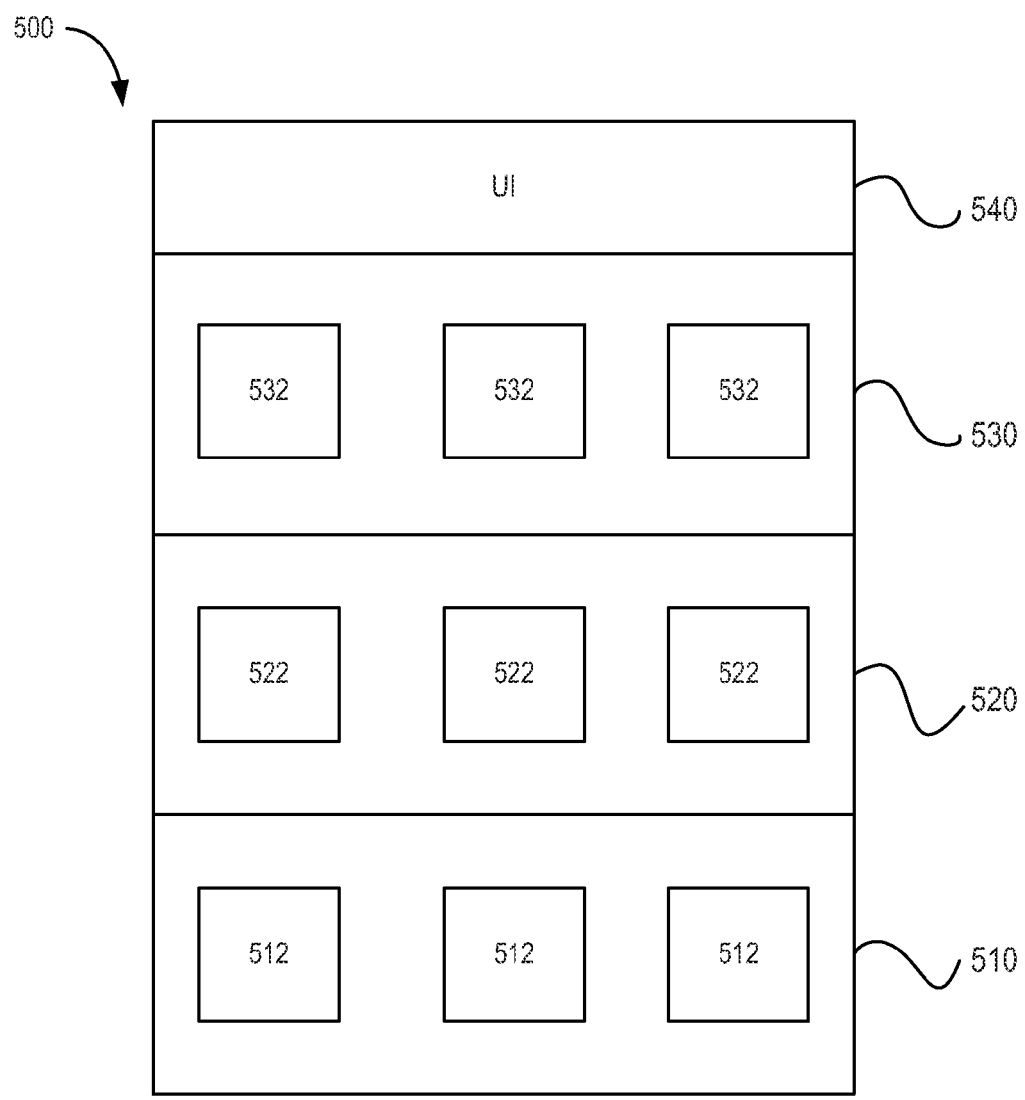
FIG. 5 is a block diagram illustrating an exemplary software stack for a control station.

Referring now to FIG. 5, there is illustrated a block diagram illustrating an exemplary software stack for a control station, such as control station 114.

Software stack 500 generally comprises a driver layer 510, a services layer 520, an application layer 530 and a user interface layer 540.

Driver layer 510 may comprise one or more driver modules 512, for interfacing with various hardware and network devices provided at control station 114, such as a processor, memory, display, input device and network device. In some cases, the driver modules 512 may provide an interface for other devices communicatively coupled to the control station. For example, a driver module may provide an interface for a network-based file system.

Services layer 520 may comprise one or more services module 522, for providing system-level services, such as encoding, decoding and rendering media files. Application layer 530 may comprise one or more application modules 532. Each of the application modules 532 may provide specific functionality to the control station. For example, an application module may provide live playback of a media stream, wherein a selected media stream can be rendered and displayed on a display of the control station. Another application module may provide playback of a media clip. Yet another application module may display a list of available media streams or media clips. Yet another application module may enable a user to browse and update metadata relating to media streams or media clips. Additional examples of application modules include: video router control modules, infrastructure equipment control modules, video equipment configuration module (e.g., providing adjustment of chroma/luma gain in video), media asset management modules, video server access modules, remote desktop control modules (e.g., VNC), encoder/decoder configuration modules, digital signage control modules, media wall control modules, and other 3$^{rd}$ party interface modules. It will be appreciated that any number of application modules can be provided and that application modules can be designed to use the services provided by services layer 520, driver layer 510, user interface 540 and even other application modules. Application modules thus enable the functionality of control station 114 to be expanded and extended.

In one example, an application module 532 may provide a metadata input interface, displayed on a display of the control station. If the control station is equipped with a touchscreen display, the metadata input interface may utilize the touchscreen display to accept input. The metadata input interface may be configured for a specific type of metadata input. For example, if the metadata relates to media streams and clips of a baseball game, the metadata input interface may comprise input options relating to baseball statistics, plays and players. Accordingly, a user of the control station and the metadata input interface can easily enter metadata relating to a media stream or media clip as it is viewed by the user on a display of the control station.

Metadata input interfaces can be customized for a variety of media stream categories. For example, media streams relating to sports, such as football, basketball, hockey, etc., may have metadata input interfaces tailored to facilitate efficient input of statistics, plays and players.

Media streams relating to entertainment or news may similarly have customized metadata input interfaces. For example, media streams relating to live awards shows for the entertainment industry may have metadata input interfaces tailored to facilitate efficient input of award names, recipient names and the like.

In some cases, as the metadata is entered, control station can determine the current timecode reference of a media clip (or media stream) playing back in an associated display viewport, and both the entered metadata and the current timecode reference can be automatically associated with the metadata. In other cases, a user may specify both the metadata and a media clip (which may be identified by one or more timecode references) with which the metadata should be associated.

User interface layer 540 generally cooperates with driver layer 510, core services layer 520 and application layer 530 to manage and render a user interface for display on a display device of the control station. The operation of user interface layer 540 is described in further detail herein.

Figure 6:
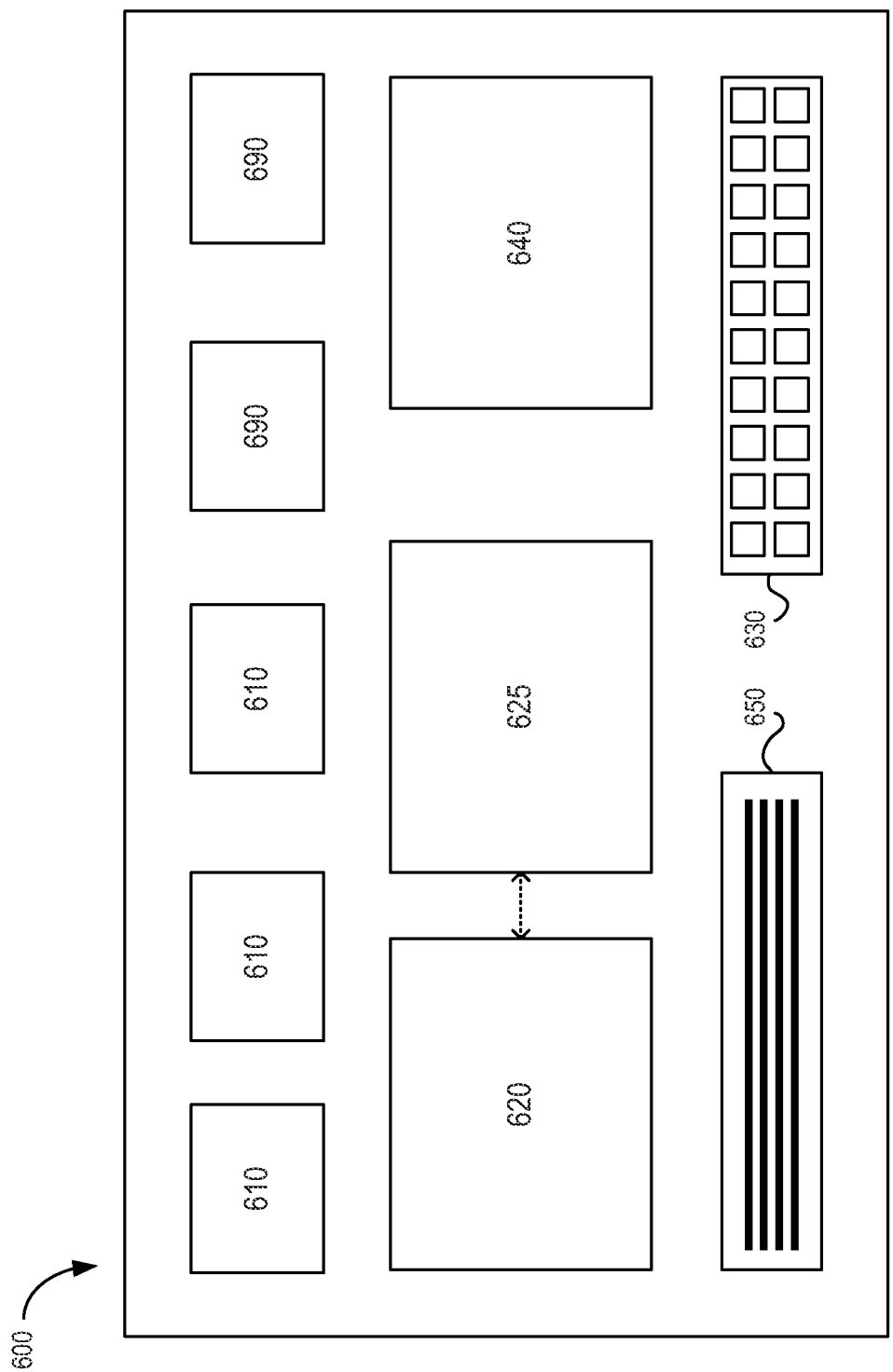
FIG. 6 illustrates an exemplary user interface.

Referring now to FIG. 6, there is illustrated an exemplary user interface that may be generated by user interface layer 540.

User interface 600 comprises one or more viewports, each of which may be generated by an application module, such as an application module 532.

In some cases, viewports may be arranged and rearranged in the user interface 600, based on user input. In other cases, viewports may be arranged according to a predetermined pattern or template, which may be context-specific or user selectable. For example, in one context of metadata input, one viewport arrangement could display a viewport displaying a live media stream, another viewport displaying stored media streams (or media clips) and a metadata input interface viewport. Another viewport arrangement could display live media streams and an output stream viewport.

In the example shown, viewports 610 display live media streams, respectively. For example, the live media streams may correspond to separate media sources (e.g., television cameras).

Viewports 620 and 625 are configured to display non-live media streams or media clips, such as media clips received from a storage server 110. The control station may receive input with instructions to "scrub" (e.g., advance frames forward or backward) through the media streams displayed in viewports 620 and 625. If control station 114 is being operated in an instant replay context, the control station may receive input with instructions to modify zoom level, modify cropping bounds, identify one or more objects to be tracked within the scene, or to set zooming control points.

In response to the input instructions, the control station may request media frames from the storage server, to be decoded and rendered in the appropriate viewport. Optionally, viewports 620 and 625 may be configured to synchronize display of two separate media streams, for example based on timecode. Accordingly, if a user wishes to review an event that was recorded in two media streams, both media streams may be shown in synchronization as they are played back or scrubbed through.

For ease of exposition, only viewports 620 and 625 are shown, but additional viewports may also be opened and synchronized with viewports 620 or 625.

Viewport 640 may be configured to display a predefined media clip. Similarly to viewports 620 and 625, viewport 640 may display a media clip received, for example, from a storage server 110.

Viewport 630 may be configured to display an input interface. The input interface may comprise user interface elements, such as buttons, slider controls, text fields, and the like. The input interface can be configured to provide control over other viewports of the user interface 600. In one example, the input interface comprises playback controls. In another example, the input interface comprises a metadata input interface.

Viewport 650 may comprise a user-selectable list of media streams stored at a storage server, and media clips available at the control station.

Viewport 690 may display the output media signal being streamed to an output node.

Figure 7:
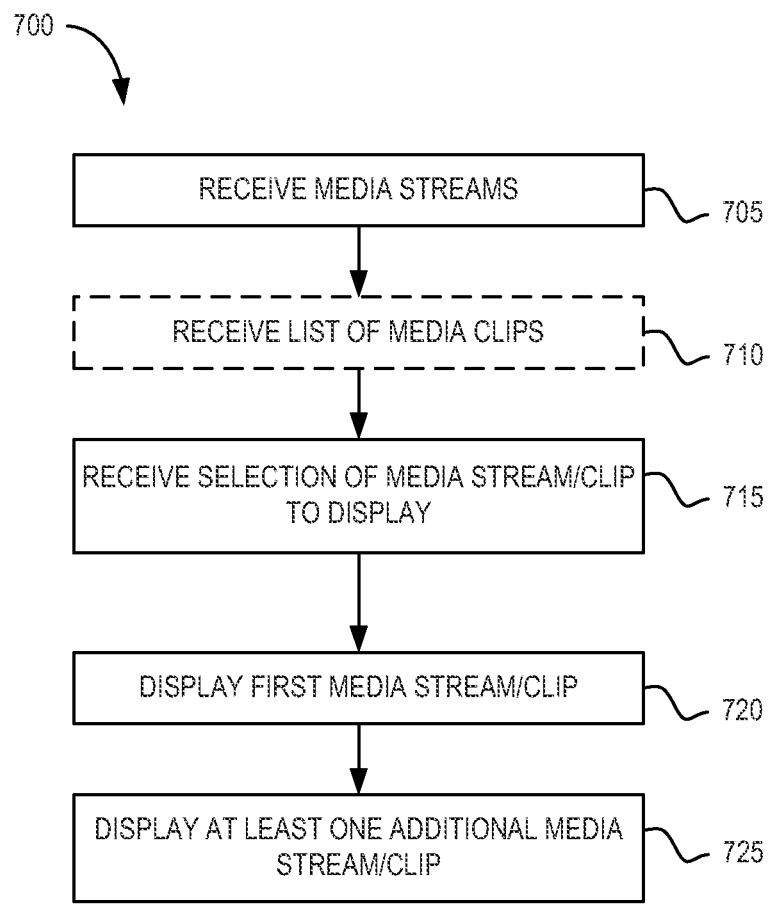
FIG. 7 is a process flow diagram for an exemplary method of managing media clips.

Referring now to FIG. 7, there is illustrated a process flow diagram for a method of managing media clips.

Method 700 may be performed by a control station, such as control station 114, using a user interface such as user interface 600.

At 705, the control station may receive a plurality of media streams over a data network from a storage server, such as storage server 110. Optionally, at 710, the control station may also receive a list of one more media clips 710.

At 715, the control station may receive input via an input device (or user interface) indicating which of the plurality of media streams to display. The input may also indicate in which viewports the media streams are to be displayed.

At 720, a first media stream of the plurality of media streams may be displayed, and, at 725, at least one additional media stream may be displayed.

In some cases, the first media stream may be displayed in a first viewport on the display, and the at least one additional media stream may be displayed in at least one additional viewport on the display. The first media stream may be displayed in synchronization with the at least one additional media stream, based on respective timecodes of the first media stream and the at least one additional media stream.

Alternatively, in some cases, the control station may display both the first media stream and the at least one additional media stream in the same viewport. In some cases, the display may be "cut" between streams according to user input or based on predefined instructions, in which case the at least one additional media stream can be displayed while automatically maintaining continuity with the first media stream based on respective timecodes of the first media stream and the at least one additional media stream. For example, the control station may request media frames from a first media stream until reaching the timecode reference at which a cut occurs and then request further media frames from a second media stream following the cut.

In other cases, a "mosaic" may be generated by the control station, wherein both the first and the additional media streams are rendered within the same viewport. Similarly, the media streams within the mosaic can be synchronized according to timecode.

In other cases, a "loop" may be generated by the control station, wherein a first media stream is played back from a start timecode reference to an end timecode reference. Subsequently, at least one additional media stream can also be played back from the same start timecode reference to the same end timecode reference.

Each of the "cut", "mosaic" and "loop" displays may be defined as metadata. Accordingly, corresponding media clips for the "cut", "mosaic" and "loop" may also be generated. Such media clips can be generated by defining appropriate metadata indicating the appropriate start and end times (e.g., timecode references) and media streams.

Figure 8:
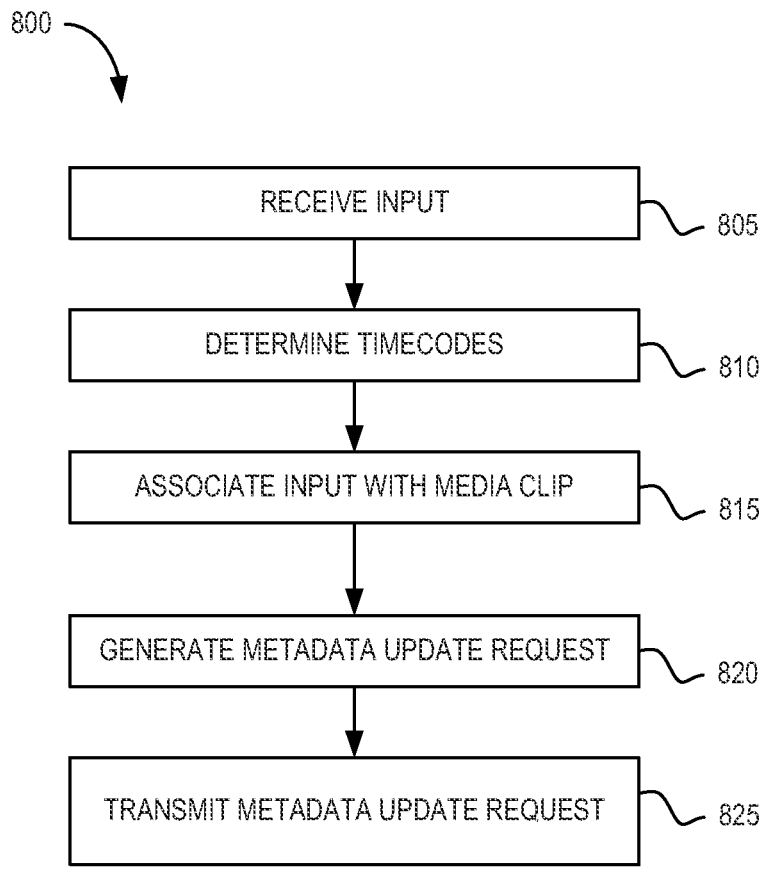
FIG. 8 is a process flow diagram for an exemplary method of managing media clip metadata.

Referring now to FIG. 8, there is illustrated a process flow diagram for an exemplary method of managing media clip metadata.

Method 800 may be performed, for example, by a control station such as control station 114, in cooperation with a user interface, such as user interface 600.

At 805, the control station may receive metadata input, for example via a metadata input interface.

At 810, the current timecode reference may be determined, or a timecode reference range may be determined. The timecode references may be determined automatically, based on a timecode reference for a currently displayed media frame, or may be received as user input.

At 815, the metadata input and the timecode references may be associated with a media stream or clip (e.g., a displayed media stream or a media stream identified in the user input). In some cases, the metadata input can be associated with individual media frames.

In some cases, where more than one media stream or media clip is displaying media frames with the same timecode (e.g., displaying synchronized videos), the input metadata may be associated with both one or more of the synchronized videos.

A metadata update request may be generated at 820; the metadata update request may comprise the timecode or timecode references, and an indication of the media stream or clip to which the metadata pertains.

At 825, the metadata update request may be transmitted to a metadata server, such as metadata server 150.

Referring now to FIGS. 9A to 12D, there are illustrated sequences of video frames in accordance with one embodiment. For example, FIGS. 9A to 9D illustrate frames 910, 920, 930 and 940 of an instant replay media clip. Although only four frames are shown for ease of illustration, it will be appreciated that the media clip may comprise any plurality of frames depending on the length of the instant replay and frame rate.

In some embodiments, control station 114 may be used to edit and generate instant replay media clips by editing metadata associated with the media clips. Control station 114 may define start and stop times for the instant replay. In particular, control station 114 may identify control points (e.g., waypoints) within two or more frames, for example by clicking or tapping on a display screen displaying the frames. Control points may be used to define and generate a tracking path. The tracking path defines a path to be followed within the sequence of frames when a zoom level or cropping bound is applied. For example, cropping bounds can be centered on the tracking path when the instant replay is output. Frames for which control points are defined may be referred to as keyframes.

When the instant replay is generated, the output media clip may be cropped according to a zoom factor or predefined cropping bounds (e.g., a 1280×720 pixel window), where the cropping bounds are centered on, attempt to encompass or are reference to the control points within keyframes. For frames that do not have explicitly defined control points, intermediate control points can be generated (e.g., by control station 114 or output node 160) along the tracking path by interpolating between keyframes, taking into account the timecodes of the keyframes and the frame containing the intermediate control point.

At any time during output of the instant replay media clip, control station 114 may receive an input modifying the current zoom level. Modification of the zoom level causes a corresponding change in the cropping bounds in the number of pixels, "zooming in" or "zooming out" of the output media clip.

Referring now specifically to FIGS. 9A to 9D, frames 910, 920, 930 and 940 illustrate instant replay generation for a fixed zoom level, with manually set control points.

Frame 910 is a keyframe illustrating cropping bounds 912 and a first manual control point 914, which can be specified by a user of control station 114. Frame 940 is a keyframe illustrating cropping bounds 942 (which, in this case, have the same dimensions as cropping bounds 912), and a second manual control point 944.

Frame 920 lacks a manual control point and is thus not a keyframe. Accordingly, an intermediate control point 924 is generated, upon which cropping bounds 922 are centered. Similarly, frame 930 has an intermediate control point 934. In some embodiments, the cropping bounds may not be centered on a control point but may have a different positional relationship to the control point. The cropping bounds may be referenced to the control point.

Each of frames 910, 920, 930 and 940 has a corresponding output frame 918, 928, 938 and 948, respectively. Output frames 918 to 948 correspond to video data within cropping bounds 912, 922, 932 and 942, respectively. Output frames need not be limited to the original size of the video data within the parent frame cropping bounds. For example, if cropping bounds 912 define a rectangle 640×360 pixels in size, output frame 918 may be resized to 1280×720 pixels in size. Typically, each of the output frames in a clip will be sized or resized to have the same resolution.

In some cases, cropping bounds may correspond with the entire parent frame size. For example, initial cropping bound 912 may encompass an entire UHD (4K) frame. Subsequent cropping bounds may be reduced in size, for example to correspond with a HD 1080p output frame. In some cases, the size of the cropping bounds may progressively be varied such that the zoom level varies in a stepwise or smooth manner as an instant replay clip in generated.

Referring now to FIGS. 10A to 10D, there is illustrated a further sequence of frames 1010, 1020, 1030 and 1040, in accordance with some embodiments in which control points are automatically identified by control station 114 based on an initial input from a user and movement of objects within a scene.

Control station 114 may be configured to receive an input, for example a click or tap, identifying an object within the scene of frame 1010. Control station 114 can subsequently track the identified object within subsequent frames in the media clip using a suitable video tracking algorithm (e.g., blob tracking, feature matching, kernel-based tracking).

For example, in frame 1010, a user has identified an object (e.g., ball) by tapping on the object. A marker 1014 is generated and displayed within a user interface to indicate the selected object. The marker 1014 may also indicate a control point within frame 1010.

In subsequent frames, control station 114 analyzes the scene, identifies the selected object and generates intermediate control points 1024, 1034 and 1044 (in frames 1020, 1030 and 1040, respectively).

Output frames 1018, 1028, 1038 and 1048 correspond to the cropping bounds 1012, 1022, 1032, 1042 referenced to the control points 1014, 1024, 1034 and 1044.

In some embodiments if the cropping bounds for a frame referenced to a control point would include a region that is smaller than the desired output frame (i.e. a portion of the cropping bounds are beyond the edges of the parent frame), the control point or the cropping bounds may be adjusted such that the cropping bounds remain within the parent frame.

Referring now to FIGS. 11A to 11D, there is illustrated a further sequence of frames 1110, 1120, 1130 and 1140, in accordance with some embodiments.

Frames 1110 to 1140 are generally analogous to frames 910 to 940, in that start frame 1110 is a keyframe with a control point 1114 and end frame 1140 is a keyframe with a control point 1144.

However, cropping bounds 1112, 1122, 1132 and 1142 each vary in size with respect to each other. In the illustrated example, cropping bounds 1122 to 1142 define rectangles that reduce in size for each successive frame, consistent with a "zooming in" action. Cropping bounds may be altered using control station 114 by directly specifying cropping bounds for one or more frames (and interpolating in between), or by manually changing a zoom level dynamically during replay.

As a result of the changing cropping bounds, output frames 1118, 1128, 1138 and 1148 are generated that appear to be progressively zoomed in. In other cases, cropping bounds may be increased in the parent frame, resulting in output frames that appear to be zoomed out.

Referring now to FIGS. 12A to 12D, there is illustrated a further sequence of frames 1210, 1220, 1230 and 1240, in accordance with some embodiments.

Control station 114 may be configured to receive one or more inputs, for example clicks or taps, identifying a plurality of objects within the scene of frame 1210. Control station 114 can subsequently track the identified objects within subsequent frames in the media clip and dynamically resize cropping bounds and zoom levels to ensure the identified objects remain within the output frame.

For example, in frame 1210, a user has identified two objects (e.g., players) by tapping on the respective players within the scene. Markers 1214A and 1214B are generated and displayed within a user interface to indicate the selected objects. The markers 1214A and 1214B may also serve as control points within frame 1210, or may be averaged to generate a control point.

In subsequent frames, control station 114 (or output node 160) analyzes the scene, identifies the selected objects and generates intermediate control points 1224, 1234 and 1244 (in frames 1220, 1230 and 1240, respectively). The intermediate control points may be generated by averaging the positions of the selected objects, for example. Control station 114 (or output node 160) further resizes cropping bounds 1222, 1232 and 1242 to contain both selected objects. Accordingly, output frames 1228, 1238 and 1248 appear to be progressively zoomed in (or zoomed out).

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein. The scope of the claims should not be limited by the preferred embodiments and examples, but should be given the broadest interpretation consistent with the description as a whole.

I claim:

1. A method of managing media clips over a data network, the method comprising:
    transmitting one or more metadata items to a metadata database, the one or more metadata items being related to a media clip record for a media clip;
    querying the metadata database using the one or more metadata items to retrieve the media clip record, the media clip record identifying (i) one or more transformations and (ii) one or more media streams corresponding to the media clip, each media stream comprising a plurality of media frames and a plurality of timecode references corresponding to the plurality of media frames;
    subsequently querying a storage server to retrieve one or more media frames corresponding to the one or more identified media streams by transmitting the corresponding timecode references, wherein the one or more media frames are retrievable based on the corresponding timecode references;
    applying the at least one identified transformation to at least one retrieved media frame to generate at least one transformed media frame; and
    generating an output media clip based on the one or more retrieved media frames including the at least one transformed media frame.

2. The method of claim 1, wherein the at least one transformation comprises cropping the at least one media frame.

3. The method of claim 1, wherein the at least one transformation comprises panning the at least one media frame.

4. The method of claim 1, further comprising arranging the one or more retrieved media frames including the at least one transformed media frame in a pre-determined sequence before generating the output media clip.

5. The method of claim 1, wherein the one or more retrieved media frames are received at a control station.

6. The method of claim 5, wherein subsequently querying the storage server to retrieve one or more media frames corresponding to the one or more media streams comprises retrieving media frames corresponding to at least two media streams, wherein the method further comprises displaying a first set of media frames corresponding to a first media stream and at least one additional set of media frames corresponding to at least one additional media stream.

7. The method of claim 6, wherein the first media stream is displayed in synchronization with the at least one additional media stream, based on respective timecode references of the media frames comprised within the first media stream and the at least one additional media stream.

8. The method of claim 6, wherein the first set of media frames corresponding to the first media stream is displayed in a first viewport, wherein the at least one additional set of media frames corresponding to the at least one additional media stream is also displayed in the first viewport, and wherein the at least one additional set of media frames is displayed while maintaining continuity with the first set of media frames based on respective timecode references of the media frames comprised within the first media stream and the at least one additional media stream.

9. The method of claim 6, wherein the first set of media frames corresponding to the first media stream is displayed in a first viewport and wherein the at least one additional set of media frames corresponding to the at least one additional media stream is displayed in a second viewport.

10. The method of claim 1, further comprising:
receiving a request for the media clip from a control station prior to querying the metadata database; and
transmitting the output media clip to an output node identified in the request.

11. A system for managing media clips, the system comprising:
a data network;
a metadata database containing a plurality of media clip records corresponding to a plurality of media clips;
a storage server containing a plurality of media streams and media frames; and
a control station comprising a processor coupled to a memory, the processor being configured to:
transmit one or more metadata items to a metadata database, the one or more metadata items being related to a media clip record for a corresponding media clip;
query the metadata database using the one or more metadata items to retrieve the media clip record, the media clip record identifying (i) one or more transformations and (ii) one or more media streams corresponding to the media clip, each media stream comprising a plurality of media frames and a plurality of timecode references corresponding to the plurality of media frames;
subsequently query the storage server to retrieve one or more media frames corresponding to the one or more identified media streams by transmitting the corresponding timecode references, wherein the one or more media frames are retrievable based on the corresponding timecode references;
apply the at least one identified transformation to at least one retrieved media frame to generate at least one transformed media frame; and
generate an output media clip based on the one or more media frames including the at least one transformed media frame.

12. The system of claim 11, wherein the at least one transformation comprises cropping the at least one media frame.

13. The system of claim 11, wherein the at least one transformation comprises panning the at least one media frame.

14. The system of claim 11, wherein the processor is further configured to arrange the one or more retrieved media frames including the at least one transformed media frame in a pre-determined sequence before generating the output media clip.

15. The system of claim 11, wherein the one or more retrieved media frames are received at a control station.

16. The system of claim 15, wherein the processor is configured to query the storage server to retrieve media frames corresponding to at least two media streams, and wherein the processor is further configured to display a first set of media frames corresponding to a first media stream and at least one additional set of media frames corresponding to at least one additional media stream.

17. The system of claim 16, wherein the processor is configured to display the first media stream in synchronization with the at least one additional media stream, based on respective timecode references of the media frames comprised within the first media stream and the at least one additional media stream.

18. The system of claim 16, wherein the processor is configured to display the first set of media frames corresponding to the first media stream in a first viewport, wherein the processor is configured to display the at least one additional set of media frames corresponding to the at least one additional media stream also in the first viewport, and wherein the processor is configured to display the at least one additional set of media frames while maintaining continuity with the first set of media frames based on respective timecode references of the media frames comprised within the first media stream and the at least one additional media stream.

19. The system of claim 16, wherein the processor is configured to display the first set of media frames corresponding to the first media stream in a first viewport and wherein the processor is configured to display the at least one additional set of media frames corresponding to the at least one additional media stream in a second viewport.

20. The system of claim 11, wherein the request comprises an identifier for an output node for displaying the output media clip, and wherein the processor is configured to transmit the output media clip to the output node identified in the request.

21. A method of generating an output media clip over a data network, the method comprising:
retrieving a media clip record corresponding to a media clip from a metadata server based on one or more metadata items, wherein the one or more metadata items relate to the media clip record, the media clip record identifying a first media stream stored on a storage server, a first start-time marker associated with the first media stream, a first stop-time marker associated with the first media stream, and a transformation;
retrieving a portion of the first media stream from the storage server, the portion being defined by the first start-time marker and the first stop-time marker;
applying the transformation identified in the media clip record to the retrieved portion of the first media stream; and generating the output media clip at an output node comprising the transformed portion of the first media stream.

22. The method of claim 21, wherein:

the media clip record further identifies a second media stream stored in the storage server, a second start-time marker associated with the second media stream, and a second stop-time marker associated with the second media stream, and the method further comprises:

retrieving a portion of the second media stream from the storage server, the portion being defined by the second start-time marker and the second stop-time marker; and concatenating the retrieved portion of the first media stream and the retrieved portion of the second media stream.

* * * * *